US012353154B2

(12) United States Patent
Okayasu et al.

(10) Patent No.: US 12,353,154 B2
(45) Date of Patent: Jul. 8, 2025

(54) IMAGE FORMING APPARATUS

(71) Applicant: CANON KABUSHIKI KAISHA, Tokyo (JP)

(72) Inventors: Kohei Okayasu, Shizuoka (JP); Takao Kume, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/621,464

(22) Filed: Mar. 29, 2024

(65) Prior Publication Data

US 2024/0345529 A1 Oct. 17, 2024

(30) Foreign Application Priority Data

Apr. 11, 2023 (JP) ................................ 2023-064365

(51) Int. Cl.
*G03G 15/00* (2006.01)
*G03G 15/02* (2006.01)
*G03G 15/20* (2006.01)

(52) U.S. Cl.
CPC ....... *G03G 15/657* (2013.01); *G03G 15/0216* (2013.01); *G03G 15/2039* (2013.01)

(58) Field of Classification Search
None
See application file for complete search history.

(56) References Cited

U.S. PATENT DOCUMENTS 11,792,342 B2 10/2023 Hagiwara et al.
2019/0286044 A1* 9/2019 Saito .......................... B41J 3/60

FOREIGN PATENT DOCUMENTS

JP 2006064748 A 3/2006
JP 2009204642 A 9/2009
JP 2019168498 A 10/2019
JP 2022018256 A 1/2022
JP 2023045480 A 4/2023

* cited by examiner

*Primary Examiner* — Leslie J Evanisko
(74) *Attorney, Agent, or Firm* — ROSSI, KIMMS & McDOWELL LLP

(57) ABSTRACT

An image forming apparatus includes an image forming unit including an image bearing member, an intermediate transfer member, and a transfer roller, a conveyance rotary member pair, a fixing unit, a first conveyance path, a second conveyance path, a reverse conveyance unit, and a control unit. The control unit is configured to perform a conveyance operation of conveying the sheet, the conveyance operation including (i) a first conveyance processing of conveying the sheet toward the reverse conveyance, (ii) a second conveyance processing of conveying the sheet toward the second conveyance path by the reverse conveyance unit, and (iii) a third conveyance processing of transferring the toner image to the sheet at the transfer nip portion. A surface, of the sheet, that faces the pressure roller in the first conveyance processing is configured to face the intermediate transfer member in the third conveyance processing.

11 Claims, 14 Drawing Sheets

IMAGE FORMING APPARATUS

BACKGROUND OF THE INVENTION

Field of the Invention

The present invention relates to an image forming apparatus that forms an image on a sheet.

Description of the Related Art

JP 2006-064748 A discloses an image forming apparatus including a rotary developing device, a photosensitive member on which a toner image is formed by the rotary developing device, and an intermediate transfer device to which the toner image formed on the photosensitive member is transferred and which transfers the toner image to a sheet. The intermediate transfer device includes an intermediate transfer belt to which the toner image is primarily transferred, and the toner image on the intermediate transfer belt is transferred to the sheet by a secondary transfer roller at a secondary transfer position. In such an image forming apparatus, when a gap is formed between the sheet and the intermediate transfer belt immediately before the secondary transfer position, an image defect such as a blank area may appear in the toner image transferred to the sheet due to discharge in the gap.

Therefore, a sheet guide member that presses the sheet against the intermediate transfer belt is provided in the image forming apparatus described in JP 2006-064748 A. The sheet guide member is urged toward the intermediate transfer belt by a pressing spring, and an urging force of the pressing spring is changed according to the type of the sheet or the temperature and humidity.

JP 2009-204642 A discloses an image forming apparatus that conveys a sheet to a transfer nip between an intermediate transfer belt and a secondary transfer roller by a standby conveyance roller pair. A sheet conveyance speed of the standby conveyance roller pair is set to be higher than a sheet conveyance speed at the transfer nip, and thus, the sheet is bent between the standby conveyance roller pair and the transfer nip. A sheet regulating member that regulates bending of the sheet toward a side opposite to the intermediate transfer belt is provided between the standby conveyance roller pair and the transfer nip. As a result, the sheet can be pressed against the intermediate transfer belt, and a gap causing discharge is not formed between the sheet and the intermediate transfer belt. A sheet conveyance speed difference between the standby conveyance roller pair and the transfer nip is changed according to the type of the sheet.

However, in the image forming apparatus described in JP 2006-064748 A, it is necessary to provide a large sheet guide member having a complicated configuration that changes a pressing force for the sheet, which causes an increase in size and cost of the image forming apparatus.

Further, in the image forming apparatus described in JP 2009-204642 A, since there is a difference in sheet conveyance speed between the standby conveyance roller pair and the transfer nip, the intermediate transfer belt forming the transfer nip and the sheet slide against each other. As a result, the toner image may be rubbed, and an image defect may occur.

SUMMARY OF THE INVENTION

According to one aspect of the present invention, an image forming apparatus includes an image forming unit including an image bearing member configured to bear a toner image, an intermediate transfer member to which the toner image on the image bearing member is primarily transferred, and a transfer roller configured to form a transfer nip portion together with the intermediate transfer member and to secondarily transfer the toner image on the intermediate transfer member to a sheet at the transfer nip portion, a conveyance rotary member pair configured to convey the sheet in a sheet conveyance direction toward the transfer nip portion, a fixing unit disposed downstream of the transfer nip portion in the sheet conveyance direction, the fixing unit including a heating unit, and a pressure roller including an elastic layer including a foam and configured to form a fixing nip portion together with the heating unit, a first conveyance path disposed upstream of the conveyance rotary member pair in the sheet conveyance direction and configured to guide the sheet to the conveyance rotary member pair from a side opposite to a rotation shaft of the transfer roller with respect to a nip line of the conveyance rotary member pair, a second conveyance path disposed upstream of the conveyance rotary member pair in the sheet conveyance direction and configured to guide the sheet to the conveyance rotary member pair from a same side as the rotation shaft with respect to the nip line, a reverse conveyance unit configured to convey the sheet having passed through the first conveyance path, the conveyance rotary member pair, the transfer nip portion, and the fixing nip portion to the second conveyance path, and a control unit configured to control the image forming unit, the conveyance rotary member pair, and the reverse conveyance unit. The control unit is configured to perform a conveyance operation of conveying the sheet, the conveyance operation including (i) a first conveyance processing of conveying the sheet toward the reverse conveyance unit via the first conveyance path, the transfer nip portion, and the fixing nip portion without transferring the toner image to the sheet at the transfer nip portion, (ii) a second conveyance processing of conveying the sheet toward the second conveyance path by the reverse conveyance unit after the first conveyance processing, and (iii) a third conveyance processing of transferring the toner image to the sheet at the transfer nip portion after the second conveyance processing, a surface, of the sheet, that faces the pressure roller in the first conveyance processing being configured to face the intermediate transfer member in the third conveyance processing.

Further features of the present invention will become apparent from the following description of exemplary embodiments with reference to the attached drawings.

DESCRIPTION OF THE EMBODIMENTS

First Embodiment

Overall Configuration

Figure 1:
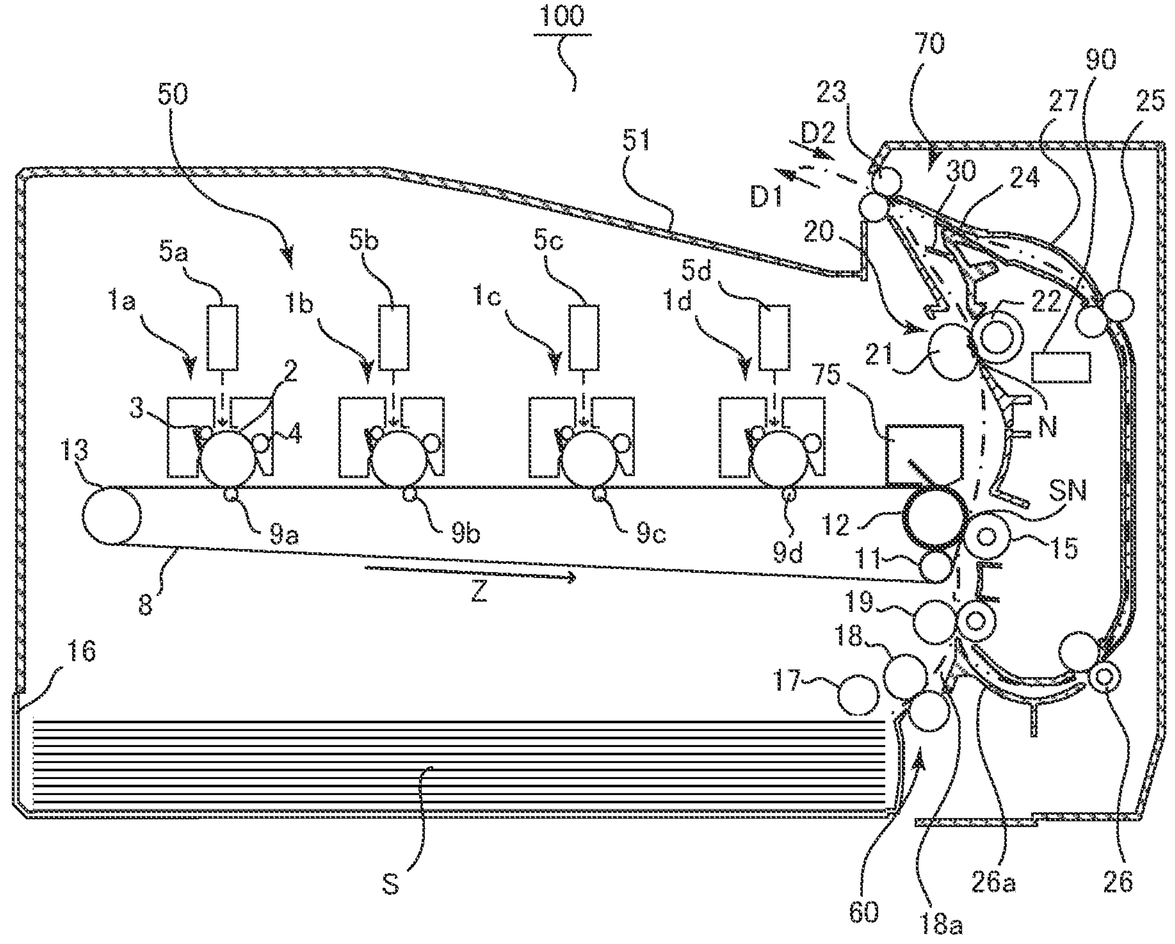
FIG. 1 is an overall schematic view illustrating a printer according to a first embodiment.

First, a first embodiment of the present invention will be described. A printer 100 serving as an image forming apparatus according to the first embodiment is an in-line type (tandem type) full-color laser beam printer. As illustrated in FIG. 1, the printer 100 includes a sheet feeding unit 60, an image forming unit 50, a fixing unit 20, and a reverse conveyance unit 70.

When an image forming command is output to the printer 100, an image forming operation in the image forming unit 50 is started based on image information input from an external computer or the like connected to the printer 100. The image forming unit 50 includes four process cartridges 1*a*, 1*b*, 1*c*, and 1*d* that form images of four colors of yellow (Y), magenta (M), cyan (C), and black (Bk), exposing units 5*a*, 5*b*, 5*c*, and 5*d*, and an intermediate transfer belt 8. The exposing units 5*a*, 5*b*, 5*c*, and 5*d* correspond to photosensitive drums of the process cartridges 1*a*, 1*b*, 1*c*, and 1*d*, respectively.

The four process cartridges 1*a*, 1*b*, 1*c*, and 1*d* have the same configuration except that colors of images to be formed are different. Only an image forming operation of the process cartridge 1*a* will be described, and a description of the process cartridges 1*b*, 1*c*, and 1*d* will be omitted.

The exposing unit 5*a* corresponding to the process cartridge 1*a* irradiates the photosensitive drum 2 of the process cartridge 1*a* with laser light based on the input image information. At this time, the photosensitive drum 2 is charged in advance by a charging roller 4, and an electrostatic latent image is formed on the photosensitive drum 2 irradiated with laser light. The photosensitive drum 2 serving as an image bearing member rotates at a predetermined process speed by a motor (not illustrated). Thereafter, the electrostatic latent image is developed by a developing roller 3, and a yellow (Y) toner image is formed on the photosensitive drum 2.

Similarly, toner images of magenta (M), cyan (C), and black (Bk) are also formed on the photosensitive drums of the process cartridges 1*b*, 1*c*, and 1*d*, respectively. The toner image of each color formed on each photosensitive drum is transferred to the intermediate transfer belt 8 by primary transfer rollers 9*a*, 9*b*, 9*c*, and 9*d*.

Then, the toner image transferred to the intermediate transfer belt 8 is conveyed to a secondary transfer roller 15 serving as a transfer roller by the intermediate transfer belt 8 rotating in an arrow Z direction serving as a rotation direction. The image forming operation for each color is performed at a timing of superimposing a toner image on an upstream toner image primarily transferred onto the intermediate transfer belt 8.

The intermediate transfer belt 8 serving as an intermediate transfer member is wound around an assist roller 11 serving as a second roller, a driving roller 12 serving as a first roller, and a tension roller 13. In other words, the intermediate transfer belt 8 is stretched around the assist roller 11, the driving roller 12, and the tension roller 13. In addition, the intermediate transfer belt 8 rotates in the arrow Z direction as the driving roller 12 rotates by the motor (not illustrated). A high-friction rubber layer is provided on a surface layer of the driving roller 12 in order to drive the intermediate transfer belt 8, and the rubber layer has conductivity with a volume resistivity of 10.5 Ωcm or less. The driving roller 12 is disposed such that the intermediate transfer belt 8 is sandwiched between the driving roller 12 and the secondary transfer roller 15. That is, the driving roller 12 faces the secondary transfer roller 15, and the intermediate transfer belt 8 is disposed between the driving roller 12 and the secondary transfer roller 15. The intermediate transfer belt 8 is sandwiched between the driving roller 12 and the secondary transfer roller 15. A transfer nip portion SN is formed between the intermediate transfer belt 8 and the secondary transfer roller 15.

The tension roller 13 applies a tension of a total pressure of about 60 N to the intermediate transfer belt 8, and rotates following the intermediate transfer belt 8. The assist roller 11 regulates an angle of the intermediate transfer belt 8 such that the sheet can enter the transfer nip portion SN while being in contact with the intermediate transfer belt 8.

The assist roller 11, the driving roller 12, and the tension roller 13 are grounded via resistance elements having the same resistance value. In the present embodiment, the resistance value of the resistance element provided in the printer 100 is any one of 1 GΩ, 100 MΩ, and 10 MΩ. Since a resistance value of the rubber layer of each of the assist roller 11 and the driving roller 12 is sufficiently small than 1 GΩ, 100 MΩ, and 10 MΩ, an electrical influence thereof can be ignored.

The secondary transfer roller 15 is implemented by an elastic roller having a volume resistivity of 107 to 109 Ωcm and a rubber hardness of 30° (Asker C hardness tester). The secondary transfer roller 15 is configured to press the driving roller 12 with a total pressure of about 39.2 N via the intermediate transfer belt 8. The secondary transfer roller 15 rotates following the intermediate transfer belt 8. Further, a voltage of −2.0 to 7.0 kV can be applied to the secondary transfer roller 15 from a transfer power supply (not illustrated).

A sheet accommodated in a cassette 16 serving as a sheet accommodation unit disposed at a lower portion of the printer 100 is fed by a pickup roller 17 in parallel with the above-described image forming operation. The sheet fed by the pickup roller 17 is conveyed to a registration roller pair 19 serving as a conveyance rotary member pair by a conveyance roller pair 18. The sheet includes paper such as a paper sheet or an envelope, a plastic film such as a sheet for an overhead projector (OHP), cloth, and the like, and includes various types of sheets such as plain paper, thick paper, and coated paper.

When the sheet abuts on a nip portion of the registration roller pair 19 in a stopped state, skew feeding is corrected. Then, a full-color toner image on the intermediate transfer belt 8 is transferred to a first surface of the sheet conveyed at a predetermined conveyance timing by the registration roller pair 19 at the transfer nip portion SN by a secondary transfer bias applied to the secondary transfer roller 15. Residual toner remaining on the intermediate transfer belt 8 is collected by a cleaner 75.

Predetermined heat and pressure are applied to the sheet to which the toner image has been transferred by the fixing unit 20, and the toner is melted and fixed. The sheet having passed through the fixing unit 20 is discharged to a sheet discharge tray 51 by a sheet discharge roller pair 23 of the reverse conveyance unit 70.

The reverse conveyance unit 70 includes the sheet discharge roller pair 23, and a sheet discharge sensor 30 and a reversal guide 24 provided between the fixing unit 20 and the sheet discharge roller pair 23. The sheet discharge sensor 30 can detect a position of a trailing edge of the sheet, and includes, for example, a flag that moves by being pressed against the sheet and an optical sensor that detects the movement of the flag. The reversal guide 24 guides the sheet reversed by the sheet discharge roller pair 23 to a duplex conveyance path 27 described below.

In a case of forming images on both surfaces of the sheet, first, the sheet is conveyed in a first direction D1 toward the outside of the apparatus by the fixing unit 20 and the sheet discharge roller pair 23. When the trailing edge of the sheet conveyed in the first direction D1 is detected by the sheet discharge sensor 30, the sheet discharge roller pair 23 rotates in reverse after the trailing edge of the sheet passes a predetermined position. As a result, the sheet is conveyed in a second direction D2 opposite to the first direction D1 by the sheet discharge roller pair 23, and is switched back. The switched-back sheet is guided to the duplex conveyance path 27 by the reversal guide 24, and is conveyed to the registration roller pair 19 again by conveyance roller pairs 25 and 26. A switching member movable between a first position and a second position may be provided between the sheet discharge sensor 30 and the sheet discharge roller pair 23. The switching member guides the sheet conveyed by the fixing unit 20 at the first position to the sheet discharge roller pair 23. The switching member guides the sheet reversed by the sheet discharge roller pair 23 toward the reversal guide 24 at the second position. The switching member moves from the first position to the second position based on the detection of the trailing edge of the sheet conveyed in the first direction D1 by the sheet discharge sensor 30.

Then, the toner image is transferred to a second surface of the sheet at the transfer nip portion SN. The toner image is fixed by the fixing unit 20, and the sheet on which the images are formed on the first surface and the second surface is discharged to the sheet discharge tray 51 by the sheet discharge roller pair 23.

Fixing Unit

Figure 2:
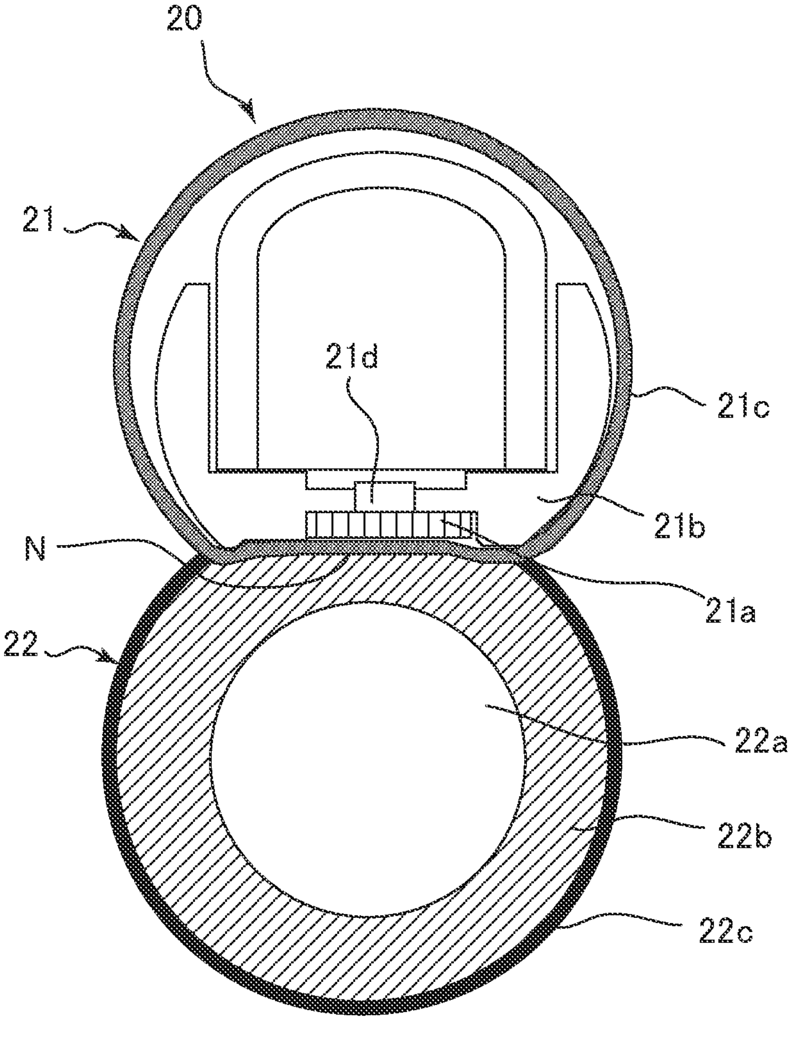
FIG. 2 is a cross-sectional view illustrating a fixing unit.

Next, the fixing unit 20 will be described in detail with reference to FIG. 2. As illustrated in FIG. 2, the fixing unit 20 includes a heating unit 21 and a pressure roller 22. The heating unit 21 includes a heater 21*a* implemented by a plate-shaped ceramic heater, a holder 21*b* that holds the heater 21*a*, and a fixing film 21*c* that incorporates the heater 21*a* and the holder 21*b* therein. A thermistor 21*d* that controls a temperature of the heater 21*a* for temperature adjustment is provided on the opposite side of the heater 21*a* from the pressure roller 22.

The pressure roller 22 is in pressure contact with the heater 21*a* and the holder 21*b* via the fixing film 21*c* to form a fixing nip portion N. In the present embodiment, the pressure roller 22 is urged toward the heating unit 21, but the heating unit 21 may also be urged toward the pressure roller 22.

The pressure roller 22 includes a metal core 22*a* formed of iron, an elastic layer 22*b* formed of foamed silicone rubber and provided on the metal core 22*a*, and a release layer 22*c* provided on the elastic layer 22*b*. The elastic layer 22*b* is positioned between the release layer 22*c* including the surface of the pressure roller 22 in contact with the sheet and the metal core 22*a*.

When the pressure roller 22 has a high heat capacity and a high thermal conductivity, heat of the surface is easily absorbed to the inside, and a surface temperature is less likely to rise. That is, a time required for the surface temperature of the pressure roller 22 to rise can be shortened by using a material having as low heat capacity and low thermal conductivity as possible, and having a high heat insulation effectiveness. For this reason, in the present embodiment, the thermal conductivity of the foamed silicone rubber serving as a foam constituting the elastic layer 22*b* of the pressure roller 22 is 0.11 to 0.16 W/m·K, which is lower than that of solid rubber having a thermal conductivity of about 0.25 to 0.29 W/m·K. A specific gravity of the solid rubber related to the heat capacity is about 1.05 to 1.30, whereas a specific gravity of the foamed silicone rubber related to the heat capacity is about 0.75 to 0.85. The elastic layer 22*b* has a low heat capacity.

When the sheet passes through the fixing nip portion N, the amount of heat applied from the fixing unit 20 is different between a surface of the sheet in contact with the heating unit 21 (hereinafter, referred to as a first contact surface) and a surface in contact with the pressure roller 22 (hereinafter, referred to as a second contact surface). Specifically, the amount of heat applied from the heating unit 21 to the first contact surface is larger than the amount of heat applied from the pressure roller 22 to the second contact surface. As a result, the first contact surface has a larger thermal shrinkage amount than the second contact surface, and the sheet is curled along an outer peripheral surface of the heating unit 21. In addition, as compared with a case where the solid rubber having a relatively high heat capacity is applied to the elastic layer 22*b* of the pressure roller 22, the amount of curl of the sheet increases in a case where the foamed silicone rubber having a low heat capacity is applied to the elastic layer 22*b* as in the present embodiment.

The amount of curl of the sheet also depends on the amount of heat of the heating unit 21, and for example, the amount of curl of the sheet can be adjusted by controlling the amount of heat of the heating unit 21.

The release layer 22*c* of the pressure roller 22 is formed of a perfluoroalkoxy resin (PFA). The release layer 22*c* is formed using, for example, a tube covering the elastic layer 22*b* or a coating material applied to the elastic layer 22*b*. However, in the present embodiment, the release layer 22*c* is formed using a durable tube covering the elastic layer 22*b*. In addition to PFA, the release layer 22*c* may be formed of a fluororesin such as polytetrafluoroethylene (PTFE) or perfluorinated ethylene-propylene copolymer (FEP), fluororubber having good releasability, silicone rubber, or the like.

The fixing film 21*c* of the heating unit 21 rotates following the pressure roller 22. The sheet is heated and pressed by the heating unit 21 and the pressure roller 22 at the fixing nip portion N, and the toner image on the sheet is fixed to the sheet. The sheet is conveyed to the sheet discharge roller pair 23 by the heating unit 21 and the pressure roller 22.

Contact Between Sheet and Intermediate Transfer Belt

Figure 3:
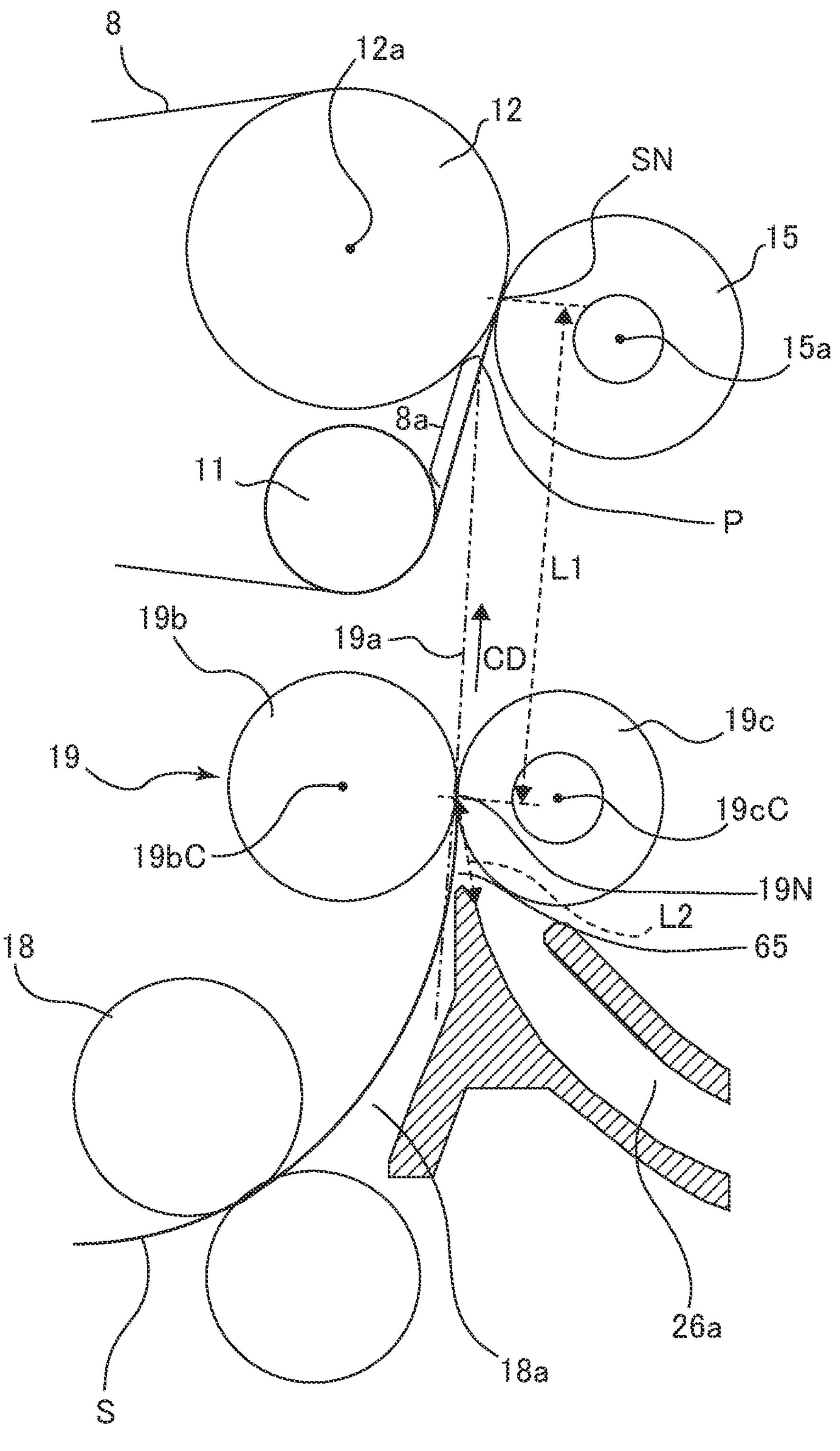
FIG. 3 is a cross-sectional view illustrating a registration roller pair, an intermediate transfer belt, and a secondary transfer roller.
Figure 4A:
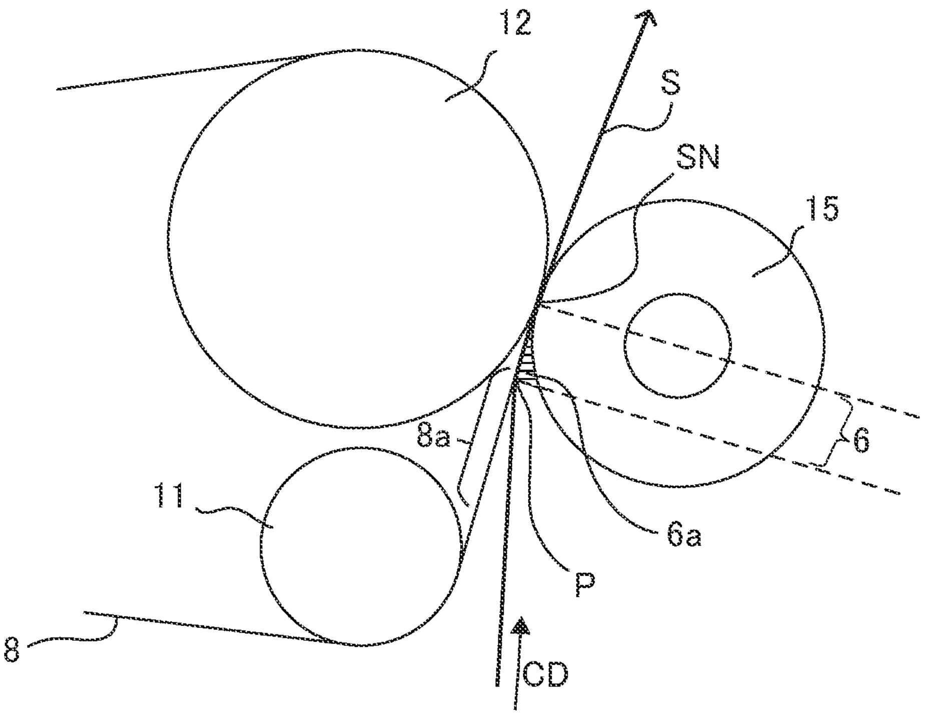
FIG. 4A is a cross-sectional view illustrating a state in which a sheet is in good contact with the intermediate transfer belt.
Figure 4B:
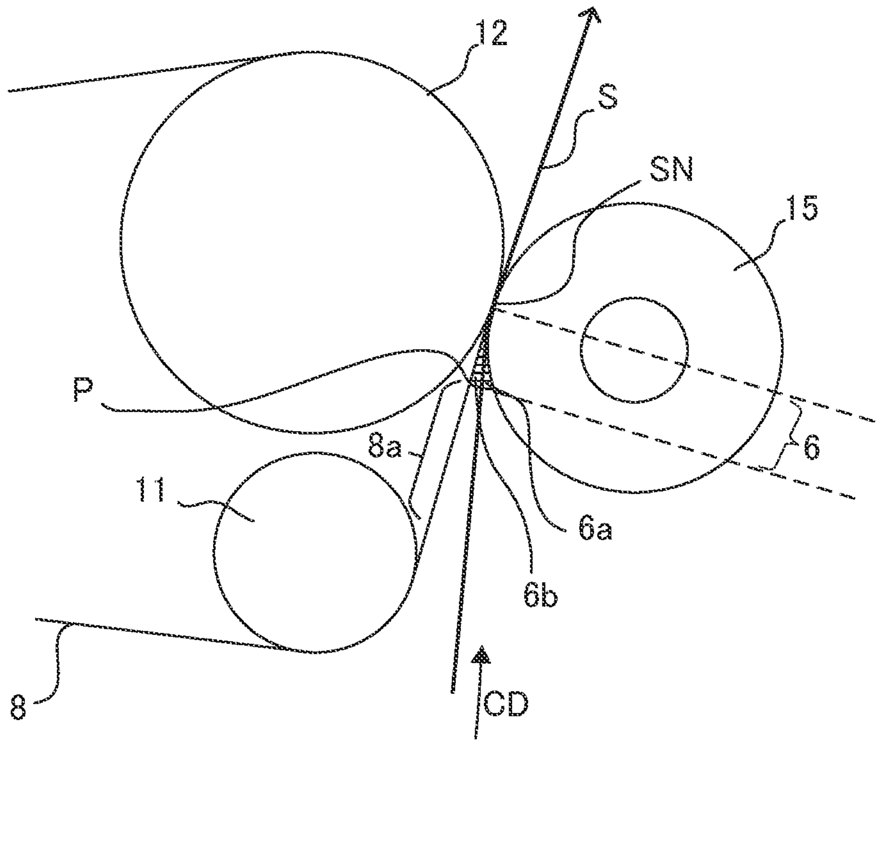
FIG. 4B is a cross-sectional view illustrating a state in which there is separation between the sheet and the intermediate transfer belt.

Next, the contact between the sheet and the intermediate transfer belt 8 will be described with reference to FIGS. 3 to 4B. FIG. 3 is a cross-sectional view illustrating the registration roller pair 19, the intermediate transfer belt 8, and the secondary transfer roller 15. FIG. 4A is a cross-sectional view illustrating a state in which a sheet S is in good contact with the intermediate transfer belt 8, and FIG. 4B is a cross-sectional view illustrating a state in which there is separation between the sheet S and the intermediate transfer belt 8. An arrow (S) in FIGS. 4A and 4B indicates a movement trajectory of the sheet S.

As illustrated in FIG. 3, the intermediate transfer belt 8 includes a belt tension portion 8*a* stretched between the assist roller 11 and the driving roller 12. The belt tension portion 8*a* is a portion positioned upstream of the driving roller 12 and downstream of the assist roller 11 in the rotation direction of the intermediate transfer belt 8 (the arrow Z direction in FIG. 1). A nip line 19*a* of the registration roller pair 19 intersects the belt tension portion 8*a* at a point P. The point P is positioned upstream of the transfer nip portion SN in a sheet conveyance direction CD. The sheet S conveyed by the registration roller pair 19 abuts on the belt tension portion 8*a*. The nip line 19*a* is a straight line orthogonal to a straight line connecting a center 19*b*C of a driving roller 19*b* and a center 19*c*C of a driven roller 19*c* of the registration roller pair 19. The registration roller pair 19 forms a nip portion 19N serving as a conveyance nip portion. The nip line 19*a* passes through the nip portion 19N of the registration roller pair 19 that nips the sheet S and conveys the sheet S in the sheet conveyance direction CD. The nip line 19*a* is a tangent line of at least one of the driving roller 19*b* or the driven roller 19*c*. In a case where deformation amounts of the driving roller 19*b* and the driven roller 19*c* are sufficiently small, the nip line 19*a* is the same as a common tangent line of the driving roller 19*b* and the driven roller 19*c*. It is preferable that an angle formed between the surface of the intermediate transfer belt 8 and the sheet S is small to suppress discharge between the sheet S and the intermediate transfer belt 8 when the sheet S abuts on the intermediate transfer belt 8. Therefore, an included angle θ formed between the belt tension portion 8*a* and the nip line 19*a* is preferably 30 degrees or less.

The sheet S fed from the cassette 16 and conveyed by the conveyance roller pair 18 is guided to the nip portion 19N of the registration roller pair 19 by a first conveyance path 18*a*. The first conveyance path 18*a* is curved, and the sheet S passing through the first conveyance path 18*a* also takes a posture curved along the first conveyance path 18*a*.

Further, a second conveyance path 26*a* which is a part of the duplex conveyance path 27 (see FIG. 1) joins the first conveyance path 18*a*. The second conveyance path 26*a* is a downstream portion of the duplex conveyance path 27 in the sheet conveyance direction CD and is curved. The second conveyance path 26*a* joins the first conveyance path 18*a* at a joining portion 65 positioned upstream of the nip portion 19N in the sheet conveyance direction CD, and the sheet S passing through the second conveyance path 26*a* takes a posture curved along the second conveyance path 26*a*.

The first conveyance path 18*a* guides the sheet S in a curved posture to the nip portion 19N of the registration roller pair 19 from the same side as the intermediate transfer belt 8 with respect to the nip line 19*a* of the registration roller pair 19. More specifically, the first conveyance path 18*a* guides the sheet S to the nip portion 19N of the registration roller pair 19 from an opposite to a rotation shaft 15*a* of the secondary transfer roller 15 with respect to the nip line 19*a* of the registration roller pair 19. In other words, the first conveyance path 18*a* guides the sheet S to the nip portion 19N of the registration roller pair 19 from the same side as a rotation shaft 12*a* of the driving roller 12 with respect to the nip line 19*a* of the registration roller pair 19. In addition, the second conveyance path 26*a* guides the sheet S in a curved posture to the nip portion 19N of the registration roller pair 19 from a side opposite to the intermediate transfer belt 8 with respect to the nip line 19*a* of the registration roller pair 19, that is, from the same side as the secondary transfer roller 15 (see FIG. 6). More specifically, the second conveyance path 26*a* guides the sheet S to the nip portion 19N of the registration roller pair 19 from the same side as the rotation shaft 15*a* of the secondary transfer roller 15 with respect to the nip line 19*a* of the registration roller pair 19.

When the sheet S is guided by the second conveyance path 26*a*, the second conveyance path 26*a* and the intermediate transfer belt 8 are disposed close to each other such that a leading edge of the sheet S abuts on the intermediate transfer belt 8 in a state in which a part of the sheet S is curved by the second conveyance path 26*a*. In the present embodiment, a second distance L2 between the nip portion 19N and the second conveyance path 26*a* is shorter than a first distance L1 between the nip portion 19N and the transfer nip portion SN. Further, the second distance L2 between the nip portion 19N and the second conveyance path 26*a* is shorter than a distance between the point P and the nip portion 19N. As a result, the leading edge of the sheet S reaches the intermediate transfer belt 8 and the nip portion 19N in a state in which a part of the sheet S is curved along the second conveyance path 26*a*.

The sheet S conveyed to the registration roller pair 19 through the first conveyance path 18*a* is conveyed along the nip line 19*a* by the registration roller pair 19. As illustrated in FIG. 4A, the sheet S abuts on the belt tension portion 8*a* at the point P, for example. Then, the sheet S enters the transfer nip portion SN while being in contact with the belt tension portion 8*a*. In FIG. 4A, a gap 6*a* is formed upstream of the transfer nip portion SN in the sheet conveyance direction CD and between the sheet S and the secondary transfer roller 15.

As illustrated in FIG. 4B, the sheet S may be conveyed by the transfer nip portion SN without abutting on the belt tension portion 8*a* at the point P. At this time, the gap 6*a* is formed between the sheet S and the secondary transfer roller 15 as in FIG. 4A, and a gap 6*b* is formed between the sheet S and the belt tension portion 8*a*. As described above, in FIGS. 4A and 4B, a region where the gaps 6*a* and 6*b* are formed is defined as a discharge region 6. The discharge region 6 is a region from the point P to the transfer nip portion SN in the sheet conveyance direction CD.

Discharge mainly occurs in the gap 6*a* between the sheet S and the secondary transfer roller 15 in a state in which the sheet S and the belt tension portion 8*a* are in contact with each other in the discharge region 6 as illustrated in FIG. 4A. The discharge in the gap 6*a* contributes to transfer of the toner image from the belt tension portion 8*a* to the sheet S, and good transferability is obtained.

On the other hand, discharge occurs in the gap 6*b* between the belt tension portion 8*a* and the sheet S in a state in which the sheet S and the belt tension portion 8*a* are not in contact with each other in the discharge region 6 as illustrated in FIG. 4B. The discharge in the gap 6*b* may cause poor toner image transfer, which may result in a so-called blank area and occurrence of image defects.

In the configuration according to the present embodiment, the nip line 19*a* of the registration roller pair 19 intersects the belt tension portion 8*a*. Therefore, as illustrated in FIG. 4A, the sheet S conveyed by the registration roller pair 19 comes into contact with the belt tension portion 8*a* before entering the transfer nip portion SN, and is fed to the transfer nip portion SN while coming into contact with the belt tension portion 8*a*. Therefore, the toner image can be satisfactorily transferred to the sheet S.

However, in a case where a stiffness of the sheet S is high as in a case of thick paper, the sheet S may be affected by the posture of the sheet S and may hardly come into contact with the belt tension portion 8*a*. Hereinafter, a sheet having a high stiffness is referred to as thick paper, and a sheet having a basis weight of 81.4 $g/m^2$ or more is referred to as thick paper. For example, a sheet having a basis weight of 81.4 $g/m^2$ to 300 $g/m^2$ is referred to as thick paper. In the present embodiment, thick paper SG having a basis weight of 150 $g/m^2$ is fed.

Posture of Thick Paper when Passing Through First Conveyance Path

Figure 5:
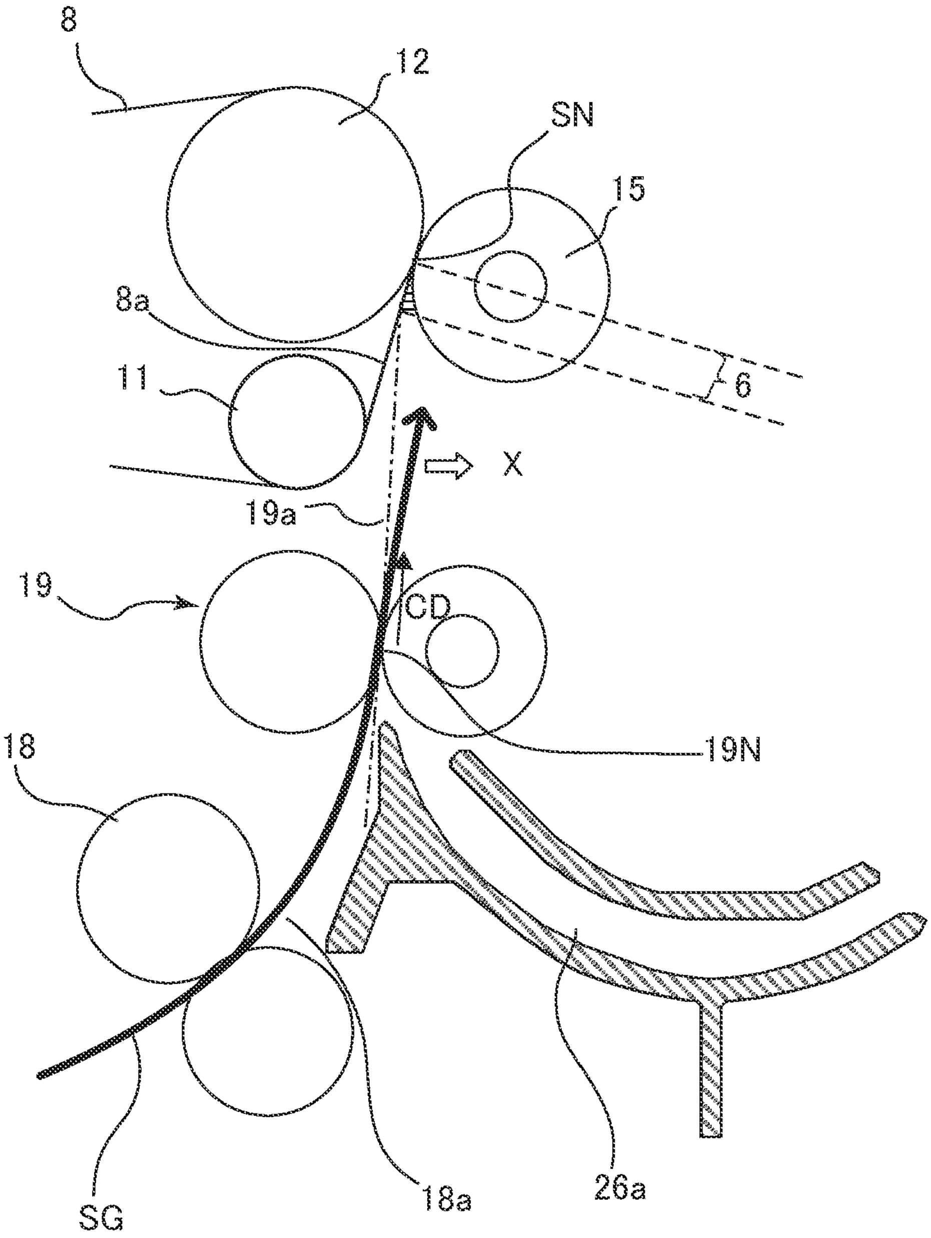
FIG. 5 is a cross-sectional view illustrating a state in which thick paper is conveyed along a first conveyance path.

FIG. 5 is a cross-sectional view illustrating a state in which the thick paper SG is conveyed along the first conveyance path 18*a*. An arrow (SG) in FIG. 5 indicates a movement trajectory of the thick paper SG. As illustrated in FIG. 5, the thick paper SG conveyed on the first conveyance path 18*a* by the conveyance roller pair 18 is fed in a curved posture to the registration roller pair 19.

Then, the thick paper SG conveyed by the registration roller pair 19 is conveyed while deviating from the nip line 19*a* toward an arrow X side in FIG. 5, that is, toward the secondary transfer roller 15 under an influence of the posture of the curved thick paper SG. This is because a stiffness of the curved thick paper SG causes the thick paper SG to return from the curved posture to a straight normal posture with the nip portion 19N of the registration roller pair 19 as a fulcrum. The deviation toward the arrow X side from the nip line 19*a* tends to be larger as the stiffness of the conveyed sheet (including the thick paper) is higher.

When the thick paper SG deviates toward the arrow X side and conveyed in this manner, it may be difficult for the thick paper SG to come into contact with the belt tension portion 8*a* of the intermediate transfer belt 8 before the discharge region 6. Then, as illustrated in FIG. 4B, the gap 6*b* is formed between the belt tension portion 8*a* and the thick paper SG (sheet), and an image defect due to the discharge in the gap 6*b* occurs.

Posture of Thick Paper when Passing Through Second Conveyance Path

Figure 6:
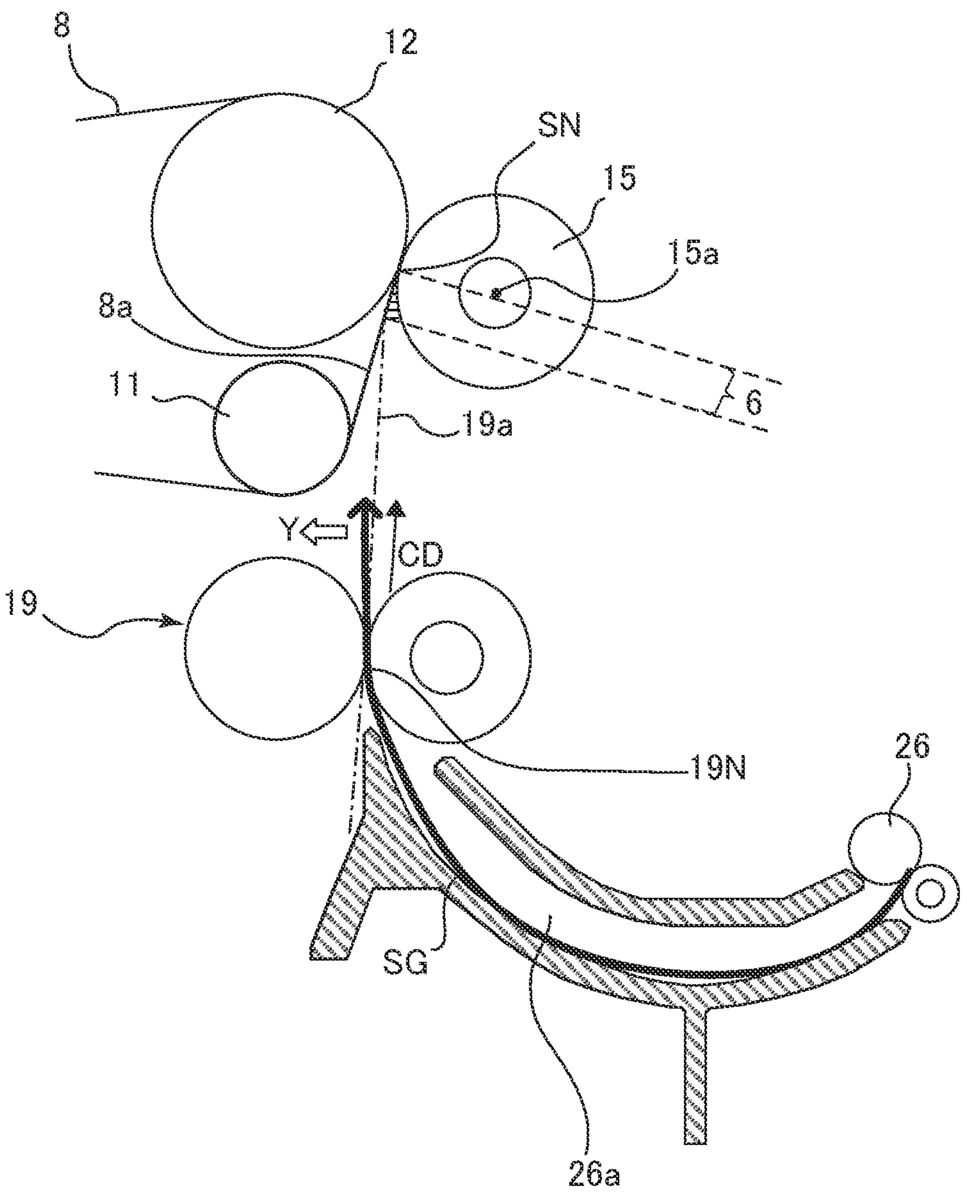
FIG. 6 is a cross-sectional view illustrating a state in which the thick paper is conveyed along a second conveyance path.

FIG. 6 is a cross-sectional view illustrating a state in which the thick paper SG is conveyed along the second conveyance path 26*a*. An arrow (SG) in FIG. 6 indicates a movement trajectory of the thick paper SG. As illustrated in FIG. 6, the thick paper SG conveyed on the second conveyance path 26*a* by the conveyance roller pair 26 is fed in a curved posture to the registration roller pair 19.

Then, the thick paper SG conveyed by the registration roller pair 19 is conveyed while deviating from the nip line 19*a* toward an arrow Y side in FIG. 6, that is, toward the intermediate transfer belt 8 under an influence of the posture of the curved thick paper SG. This is because a stiffness of the curved thick paper SG causes the thick paper SG to return from the curved posture to a straight normal posture with the nip portion 19N of the registration roller pair 19 as a fulcrum. The deviation toward the arrow Y side from the nip line 19*a* tends to be larger as the stiffness of the conveyed sheet (including the thick paper) is higher.

Furthermore, as described above, the thick paper SG passing through the second conveyance path 26*a* passes through the fixing unit 20, is conveyed to the duplex conveyance path 27 by the reverse conveyance unit 70, and reaches the second conveyance path 26*a*. The thick paper SG is curled at the fixing nip portion N of the fixing unit 20, and the curling is made along the curved shape of the second conveyance path 26*a* as the front and back sides of the thick paper SG are reversed in the reverse conveyance unit 70. That is, the thick paper SG is curled by the fixing unit 20 serving as a curling unit and a fixing unit, so that the thick paper SG is further curled along the shape of the second conveyance path 26*a*.

As a result, the thick paper SG conveyed by the registration roller pair 19 is conveyed while deviating from the nip line 19*a* in an arrow Y direction, and reliably comes into contact with the belt tension portion 8*a* at a position upstream of the transfer nip portion SN in the sheet conveyance direction CD. Since the thick paper SG enters the transfer nip portion SN while being in contact with the belt tension portion 8*a*, there is no gap 6*b* illustrated in FIG. 4B between the thick paper SG and the belt tension portion 8*a*. Therefore, even with the thick paper SG having a high stiffness, it is possible to suppress image defects and to transfer a toner image satisfactorily. As described above, the sheet conveyed from the second conveyance path 26*a* to the registration roller pair 19 tends to be conveyed while having more contact with the belt tension portion 8*a* compared to the sheet conveyed from the first conveyance path 18*a* to the registration roller pair 19.

Control Blocks

Figure 7:
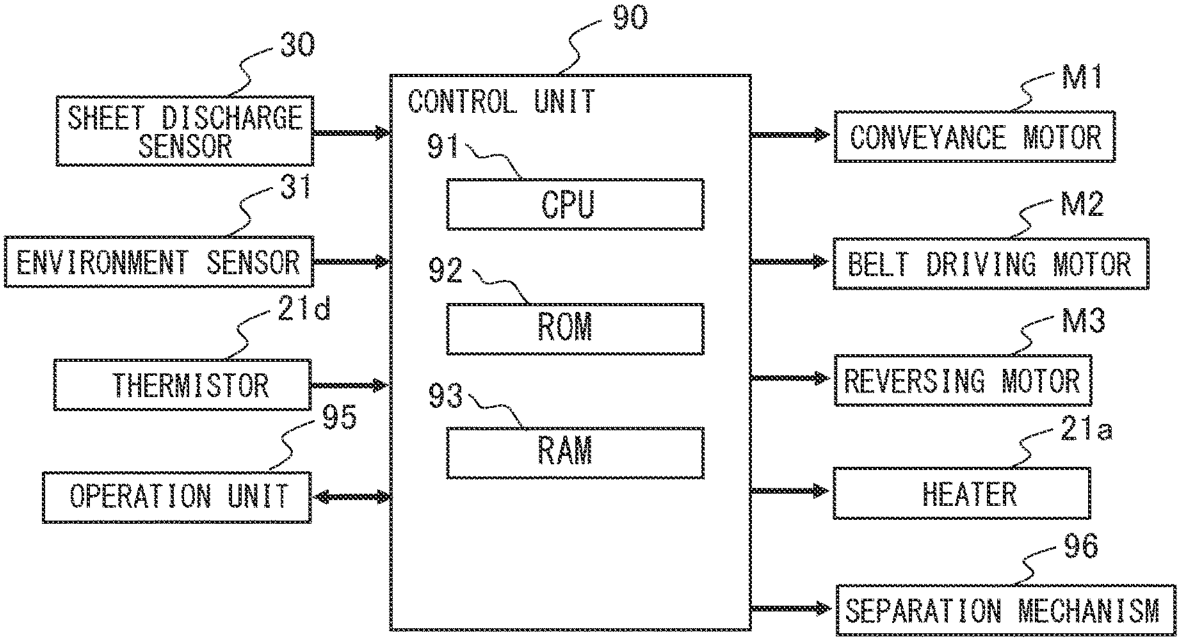
FIG. 7 is a block diagram illustrating control blocks of the printer.

FIG. 7 is a block diagram illustrating control blocks of the printer 100 according to the present embodiment. As illustrated in FIG. 7, the printer 100 includes a control unit 90. The control unit 90 includes a central processing unit (CPU) 91, a read only memory (ROM) 92, and a random access memory (RAM) 93. The ROM 92 stores various programs, and the CPU 91 reads and executes the programs stored in the ROM 92. The RAM 93 is used as a work area of the CPU 91.

The sheet discharge sensor 30, the thermistor 21*d*, and an environment sensor 31 are connected to an input side of the control unit 90. In the present embodiment, the sheet discharge sensor 30 is disposed downstream of the fixing unit 20 in the sheet conveyance direction CD, but the present technology is not limited thereto. That is, the sheet discharge sensor 30 may be disposed anywhere as long as the sheet discharge sensor 30 can abut on the sheet conveyed on the conveyance path.

The environment sensor 31 is disposed inside the printer 100 and detects ambient humidity. That is, the environment sensor 31 detects a temperature inside the printer 100 or around the cassette 16.

A conveyance motor M1, a belt driving motor M2, a reversing motor M3, the heater 21*a*, and a separation mechanism 96 are connected to an output side of the control unit 90. The conveyance motor M1 drives the pickup roller 17, the conveyance roller pairs 18, 25, and 26, the registration roller pair 19, and the pressure roller 22. The belt driving motor M2 drives the driving roller 12 for rotating the intermediate transfer belt 8. The reversing motor M3 rotates the sheet discharge roller pair 23 forward and backward. The separation mechanism 96 separates the photosensitive drums of the four process cartridges 1*a*, 1*b*, 1*c*, and 1*d* and the intermediate transfer belt 8 from each other.

A drive source of each roller is not limited to the above-described configuration. For example, a clutch mechanism or a forward/reverse rotation mechanism (not illustrated) may be provided to reduce the number of motors. For example, each roller described above may be driven by only one motor.

An operation unit 95 implemented by a liquid crystal panel, a physical button, or the like is connected to the control unit 90. A user can designate each printing mode to be described below via the operation unit 95.

Description of Each Printing Mode

Figure 8:
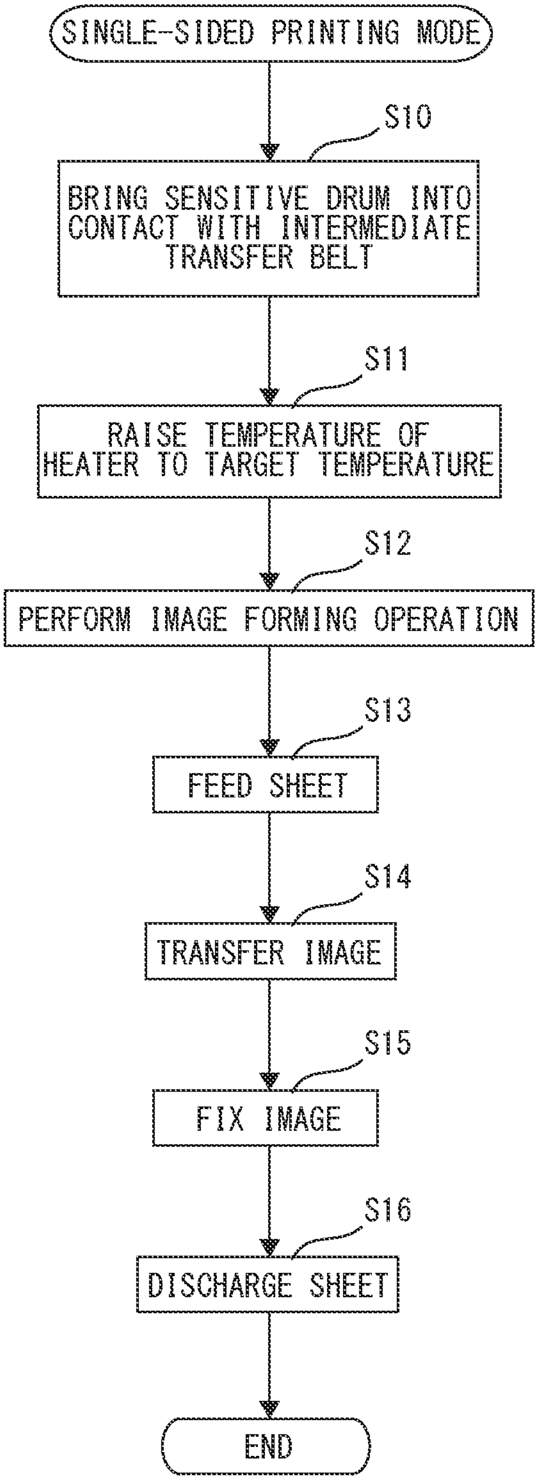
FIG. 8 is a flowchart illustrating a single-sided printing mode.
Figure 9:
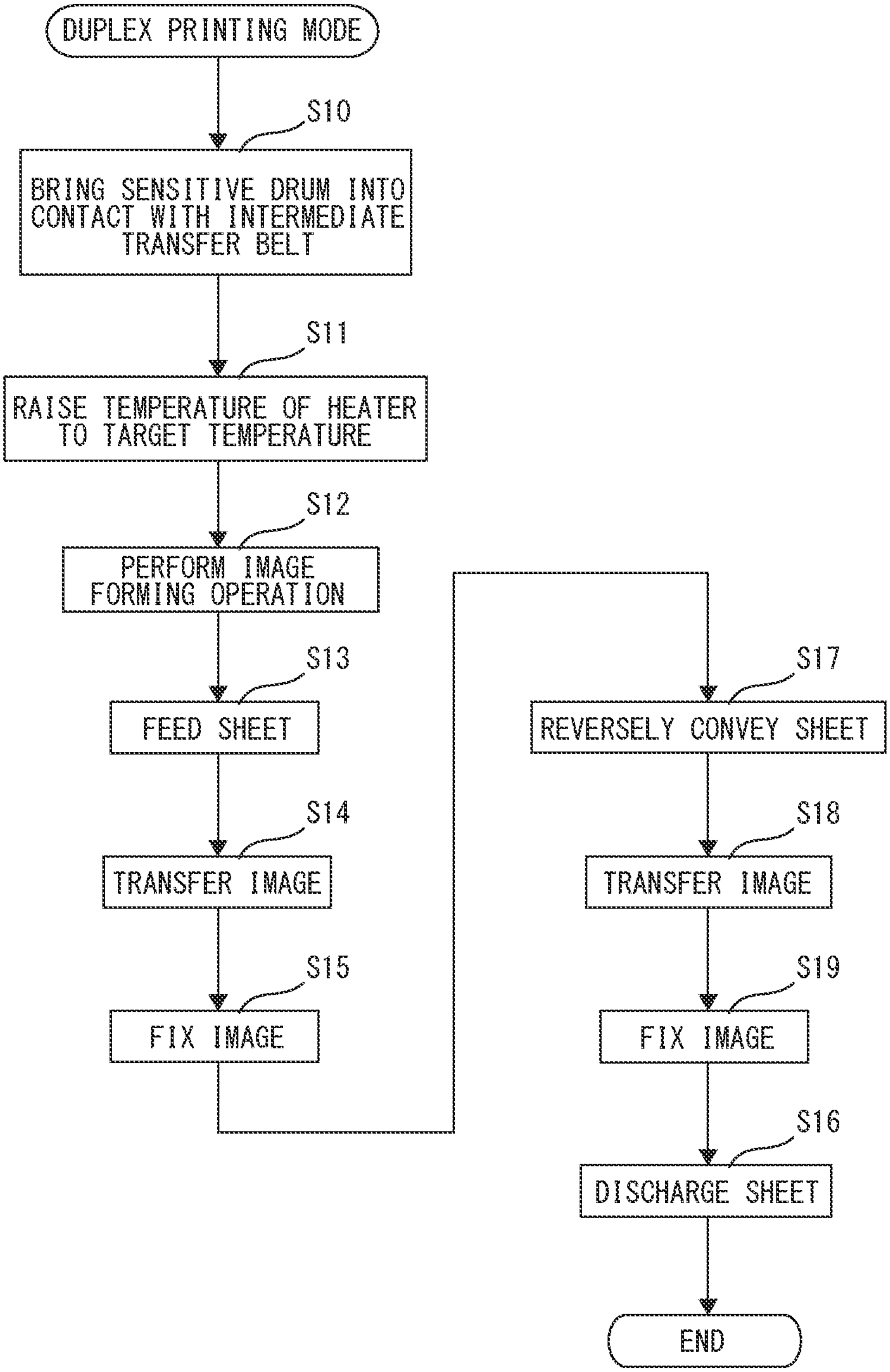
FIG. 9 is a flowchart illustrating a duplex printing mode.
Figure 10:
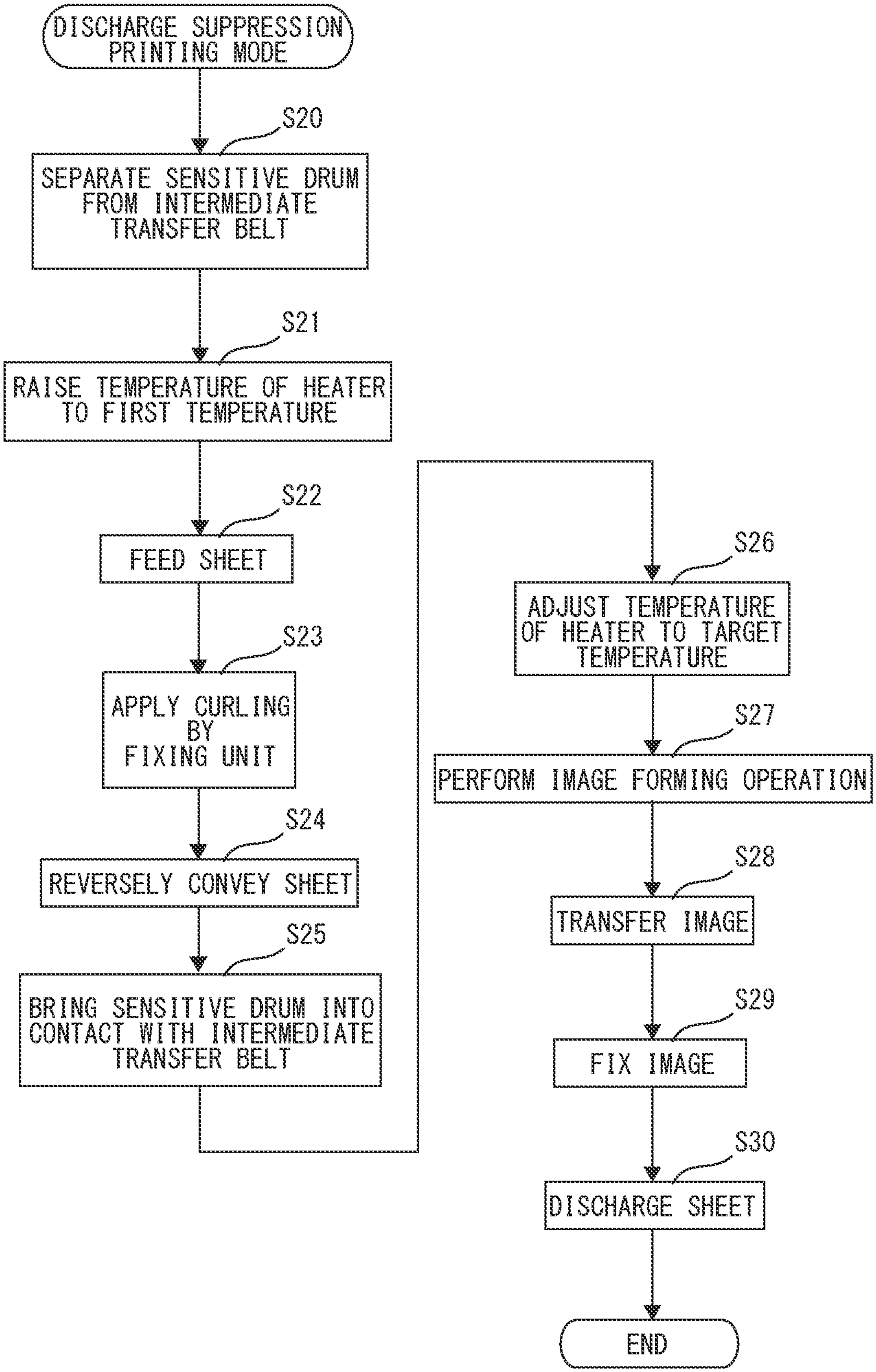
FIG. 10 is a flowchart illustrating a discharge suppression printing mode.

Next, each printing mode according to the present embodiment will be described with reference to FIGS. 1 and 8 to 10. FIG. 8 is a flowchart illustrating each processing in a single-sided printing mode. FIG. 9 is a flowchart illustrating each processing in a duplex printing mode. FIG. 10 is a flowchart illustrating each processing in a discharge suppression printing mode.

The control unit 90 is connected to a host computer (a personal computer or the like) (not illustrated), and the user can select any one of the single-sided printing mode, the duplex printing mode, and the discharge suppression printing mode to be described below through the host computer or the operation unit 95. The control unit 90 operates the printer 100 according to the printing mode selected by the user.

Single-Sided Printing Mode

First, the single-sided printing mode will be described. As illustrated in FIGS. 1 and 8, when the single-sided printing mode is started, the control unit 90 brings the photosensitive drums of the four process cartridges 1*a*, 1*b*, 1*c*, and 1*d* into contact with the intermediate transfer belt 8 (step S10). Then, the photosensitive drums and the intermediate transfer belt 8 are driven.

Next, the control unit 90 raises the temperature of the heater 21*a* until the temperature reaches a predetermined target temperature (step S11). The temperature of the heater 21*a* is adjusted to the target temperature (adjusted temperature) by the thermistor 21*d*. In the present embodiment, the adjusted temperature of the heater 21*a* in the single-sided printing mode and the duplex printing mode is 190° C. Step S11 may be performed before step S10, or may be performed simultaneously with step S10.

Then, the control unit 90 performs the above-described image forming operation (step S12). That is, the exposing unit 5*a* irradiates the photosensitive drum 2 of the process cartridge 1*a* with laser light based on the input image information. At this time, the photosensitive drum 2 is charged in advance by a charging roller 4, and an electrostatic latent image is formed on the photosensitive drum 2 irradiated with laser light. The photosensitive drum 2 rotates at the predetermined process speed by the motor (not illustrated). Thereafter, the electrostatic latent image is developed by a developing roller 3, and a yellow (Y) toner image is formed on the photosensitive drum 2.

Similarly, toner images of magenta (M), cyan (C), and black (Bk) are also formed on the photosensitive drums of the process cartridges 1*b*, 1*c*, and 1*d*, respectively. The toner image of each color formed on each photosensitive drum is transferred to the intermediate transfer belt 8 by primary transfer rollers 9*a*, 9*b*, 9*c*, and 9*d*. The image forming operation of step S12 may be performed before step S11, or may be performed simultaneously with step S11.

Then, the control unit 90 feeds the sheet S from the cassette 16 according to a transfer timing of the toner image transferred to the intermediate transfer belt 8 (step S13). The feeding of the sheet S may be performed in parallel with the image forming operation of step S12 described above.

Next, the sheet S is conveyed to the transfer nip portion SN by the registration roller pair 19 via the first conveyance path 18*a* (see FIG. 3). The full-color toner image on the intermediate transfer belt 8 is transferred to the first surface of the sheet S at the transfer nip portion SN (step S14).

The predetermined heat and pressure are applied to the sheet to which the toner image has been transferred by the fixing unit 20, and the toner is melted and fixed (step S15). The sheet S having passed through the fixing unit 20 is discharged to the sheet discharge tray 51 by the sheet discharge roller pair 23 of the reverse conveyance unit 70 (step S16).

Duplex Printing Mode

Next, the duplex printing mode will be described. As illustrated in FIGS. 1 and 9, when the single-sided printing mode is started, steps S10 to S15 are performed as described in the single-sided printing mode. Steps S10 to S15 are the same as those in the single-sided printing mode, and thus, a description thereof is omitted.

The control unit 90 is configured not to convey the sheet S having a length smaller than a predetermined length in the duplex printing mode. That is, the sheet S having a length smaller than the predetermined length is not allowed to be conveyed to the second conveyance path 26*a*. Meanwhile, a sheet having the smallest size among sheets allowed to be conveyed to the second conveyance path 26*a* is set as a minimum sheet. The control unit 90 can acquire the size of the sheet S to be used based on an input via the operation unit 95. Further, the control unit 90 can acquire the size of the sheet S to be used based on an output of a detection unit (not illustrated) that detects the size of the sheet S.

Here, as illustrated in FIG. 3, the first distance L1 between the nip portion 19N and the transfer nip portion SN is shorter than a length obtained by subtracting the first distance L1 from a length of the minimum sheet in the sheet conveyance direction CD. As a result, when the leading edge of the sheet S reaches the transfer nip portion SN, a length of a portion of the sheet S positioned upstream of the nip portion 19N is larger than a length of a portion positioned downstream of the nip portion 19N in the sheet conveyance direction CD. The second conveyance path 26*a* is disposed close to the nip portion 19N of the registration roller pair 19, and the second distance L2 between the nip portion 19N and the second conveyance path 26*a* is shorter than the first distance L1. As a result, when the leading edge of the sheet S reaches the transfer nip portion SN, a length of a portion of the sheet S that is curved along the second conveyance path 26*a* is larger than the length of the portion positioned downstream of the nip portion 19N in the sheet conveyance direction CD.

In the present embodiment, the minimum sheet is an A5-sized sheet, and the length of the minimum sheet in the sheet conveyance direction CD is 210 mm. The first distance between the nip portion 19N and the transfer nip portion SN is preferably 50% or less of the length of the minimum sheet, and more preferably 25% or less of the length of the minimum sheet. The distance between the nip portion 19N and the point P is shorter than the first distance L1 between the nip portion 19N and the transfer nip portion SN.

The sheet S having the first surface on which the image is formed is conveyed in the first direction D1 toward the outside of the apparatus by the sheet discharge roller pair 23. The control unit 90 rotates the sheet discharge roller pair 23 in reverse after the trailing edge of the sheet passes a predetermined position based on the detection of the trailing edge of the sheet conveyed in the first direction D1 by the sheet discharge sensor 30. As a result, the sheet S is conveyed in the second direction D2 opposite to the first direction D1 by the sheet discharge roller pair 23, and is switched back. That is, the sheet S is reversely conveyed (step S17). The switched-back sheet is guided to the duplex conveyance path 27 by the reversal guide 24, and is conveyed to the registration roller pair 19 again by conveyance roller pairs 25 and 26. At this time, the sheet S passes through the second conveyance path 26*a*.

Then, the toner image is transferred to the second surface of the sheet at the transfer nip portion SN (step S18). The predetermined heat and pressure are applied to the sheet having the second surface to which the toner image has been transferred by the fixing unit 20, and the toner is melted and fixed (step S19). The sheet S having passed through the fixing unit 20 is discharged to the sheet discharge tray 51 by the sheet discharge roller pair 23 of the reverse conveyance unit 70 (step S16).

Discharge Suppression Printing Mode

Next, the discharge suppression printing mode will be described. Hereinafter, for example, a case where the thick paper SG is fed in the discharge suppression printing mode will be described. As illustrated in FIGS. 1 and 10, when the discharge suppression printing mode is started, the control unit 90 causes the separation mechanism 96 to separate the intermediate transfer belt 8 from the photosensitive drums of the four process cartridges 1*a*, 1*b*, 1*c*, and 1*d* (step S20). The separation mechanism 96 separates the intermediate transfer belt 8 from each of the photosensitive drums, for example, by moving a holder holding the tension roller 13 and the primary transfer rollers 9*a*, 9*b*, 9*c*, and 9*d* downward. Then, the control unit 90 causes the belt driving motor M2 to drive the intermediate transfer belt 8.

Next, the control unit 90 raises the temperature of the heater 21*a* until the temperature reaches a first temperature (step S21). The temperature of the heater 21*a* is adjusted to the first temperature by the thermistor 21*d*. The first temperature may be the same as or different from the target temperature of the single-sided printing mode or the duplex printing mode. In the present embodiment, the first temperature which is the adjusted temperature of the heater 21*a* in step S21 is set to 120° C. lower than the adjusted temperature (for example, 190° C.) for fixing the toner image. As described above, by setting the adjusted temperature of the heater 21*a* to the first temperature lower than the target temperature for fixing the toner image, energy saving can be achieved. However, the first temperature is preferably a temperature at which the fixing film 21*c* smoothly slides. Step S21 may be performed before step S20, or may be performed simultaneously with step S20.

Next, the control unit 90 feeds the thick paper SG in the cassette 16 (step S22). Step 22 may be performed simultaneously with the energization of the heater 21*a*. Step S22 is performed before the image forming operation (step S27) of the image forming unit 50. The thick paper SG is conveyed to the transfer nip portion SN by the registration roller pair 19 via the first conveyance path 18*a*. The thick paper SG is conveyed toward the fixing unit 20 by the registration roller pair 19 and the transfer nip portion SN, but the toner image is not transferred to the thick paper SG when passing through the transfer nip portion SN. That is, when the thick paper SG first passes through the transfer nip portion SN, a transfer voltage is not applied to the secondary transfer roller 15. Further, after the thick paper SG first passes through the transfer nip portion SN, the toner image formed on the intermediate transfer belt 8 is conveyed to the transfer nip portion SN.

Then, the thick paper SG is curled at the fixing nip portion N of the fixing unit 20 (step S23). At this time, the thick paper SG is curled along the outer peripheral surface of the heating unit 21 due to a surface temperature difference between the heating unit 21 and the pressure roller 22. The surface temperature difference between the heating unit 21 and the pressure roller 22 is preferably in a range of 20° C. to 50° C.

In the present embodiment, as described above, the temperature of the heater 21*a* is adjusted to the first temperature of, for example, 120° C. At this time, a surface temperature of the fixing film 21*c* is 110° C., and a surface temperature of the pressure roller 22 is about 70° C. However, conditions such as a temperature setting of the heater 21*a* and the surface temperature difference between the heating unit 21 and the pressure roller 22 may be appropriately changed depending on the type of the sheet and environmental conditions.

The thick paper SG curled by the fixing unit 20 is reversely conveyed by the reverse conveyance unit 70 similarly to step S17 described above (step S24). The reversely conveyed (switched-back) thick paper SG is guided to the duplex conveyance path 27 by the reversal guide 24, and is conveyed again to the registration roller pair 19 by the conveyance roller pairs 25 and 26. At this time, the sheet S passes through the second conveyance path 26*a*.

In parallel with step S24, the control unit 90 brings the photosensitive drums of the four process cartridges 1*a*, 1*b*, 1*c*, and 1*d* into contact with the intermediate transfer belt 8 (step S25). Then, the photosensitive drums and the intermediate transfer belt 8 are driven.

Furthermore, the control unit 90 raises the temperature of the heater 21*a* until the temperature reaches a predetermined target temperature. The target temperature of the heater 21*a* in step S26 is higher than the first temperature in step S21. The temperature of the heater 21*a* is adjusted to the target temperature (adjusted temperature) by the thermistor 21*d* (step S26). The adjusted temperature of the heater 21*a* in step S26 is 190° C. Step S26 may be performed before steps S24 and S25, or may be performed simultaneously with steps S24 and S25.

Then, the control unit 90 performs the image forming operation as in step S12 described above (step S27). The thick paper SG conveyed by the registration roller pair 19 via the second conveyance path 26*a* has a curved posture as illustrated in FIG. 6. The thick paper SG is conveyed while deviating from the nip line 19*a* toward the arrow Y side in FIG. 6, that is, toward the intermediate transfer belt 8 under the influence of the posture of the curved thick paper SG.

Further, the thick paper SG is curled in step S23, and the curling is made along the curved shape of the second conveyance path 26*a* as the front and back sides of the thick paper SG are reversed in the reverse conveyance unit 70. That is, the thick paper SG is further curled along the shape of the second conveyance path 26*a* by being curled by the fixing unit 20.

As a result, the thick paper SG reliably comes into contact with the belt tension portion 8*a* at a position upstream of the transfer nip portion SN in the sheet conveyance direction CD, and enters the transfer nip portion SN while being in contact with the belt tension portion 8*a*.

The full-color toner image on the intermediate transfer belt 8 is transferred to the first surface of the sheet S at the transfer nip portion SN (step S28). The predetermined heat and pressure are applied to the sheet to which the toner image has been transferred by the fixing unit 20, and the toner is melted and fixed (step S29). The sheet S having passed through the fixing unit 20 is discharged to the sheet discharge tray 51 by the sheet discharge roller pair 23 of the reverse conveyance unit 70 (step S30).

Such a mode and the discharge suppression printing mode serving as a conveyance operation include first conveyance processing, second conveyance processing, and third conveyance processing described below. The first conveyance processing includes steps S21, S22, and S23, and is processing of conveying the sheet toward the reverse conveyance unit 70 via the first conveyance path 18*a*, the transfer nip portion SN, and the fixing nip portion N without transferring the toner image to the sheet at the transfer nip portion SN. The second conveyance processing includes step S24, and is processing of conveying the sheet toward the second conveyance path 26*a* by the reverse conveyance unit 70 after the first conveyance processing. The third conveyance processing includes steps S26, S27, S28, and S29, and is processing of transferring the toner image to the sheet at the transfer nip portion SN after the second conveyance processing. In the discharge suppression printing mode, the sheet Sis conveyed such that the surface of the sheet S that faces the pressure roller 22 in the first conveyance processing faces the intermediate transfer belt 8 in the third conveyance processing. In other words, the reverse conveyance unit 70 and the second conveyance path 26*a* are disposed such that the surface of the sheet S that faces the pressure roller 22 in the first conveyance processing faces the intermediate transfer belt 8 in the third conveyance processing. In the discharge suppression printing mode, the control unit 90 controls the heater 21*a* such that a temperature of the heater 21*a* in the first conveyance processing is different from a temperature of the heater 21*a* in the third conveyance processing. More specifically, the control unit 90 controls the heater 21*a* such that the temperature of the heater 21*a* in the third conveyance processing, that is, the target temperature in step S21, is higher than the temperature of the heater 21*a* in the first conveyance processing, that is, the first temperature in step S26.

For example, in a case where a large number of sheets are printed immediately before the discharge suppression printing mode, the temperature of the pressure roller 22 may rise, as a result of which a surface temperature difference between the fixing film 21*c* and the pressure roller 22 may be less likely to occur. In this case, a time until the fixing unit 20 is cooled is determined based on a detection result of the thermistor 21*d*, and the control unit 90 may delay the feeding of the sheet until the fixing unit 20 is cooled.

Confirmation of Effect

In order to confirm the effect of the discharge suppression printing mode according to the present embodiment, printing was performed under an environment of a room temperature of 15° C. and a humidity of 10%, and the presence or absence of occurrence of an image defect caused by the discharge in the gap 6*b* (see FIG. 4B) was confirmed.

Sheets used are plain paper having a basis weight of 80 $g/m^2$ and thick paper having a basis weight of 150 $g/m^2$, and the sheets are A4-size sheets. The plain paper and the thick paper were exposed to the above environment for 48 hours. Printing was performed on the plain paper and the thick paper in the single-sided printing mode and the discharge suppression printing mode, and the occurrence of an image defect was visually evaluated. The experimental results are shown in Table 1 below.

TABLE 1

| | Plain paper (80 $g/m^2$) | Thick paper(150 $g/m^2$) |
|---|---|---|
| Single-sided printing mode | No image defect | Image defect occurred |
| Discharge suppression printing mode | No image defect | No image defect |

As shown in Table 1 above, even in the single-sided printing mode, an image defect caused by the discharge did not occur in a case of the plain paper, but an image defect caused by the discharge in the gap 6*b* (see FIG. 4B) occurred in a case of the thick paper. On the other hand, in the discharge suppression printing mode, an image defect caused by the discharge in the gap 6*b* (see FIG. 4B) did not occur even with the thick paper, and good transferability could be provided.

As described above, image defects can be suppressed by executing the discharge suppression printing mode on thick paper having a high stiffness. This is because the sheet conveyed to the transfer nip portion SN via the second conveyance path 26*a* in the discharge suppression printing mode is closer to the intermediate transfer belt 8 than the sheet conveyed to the transfer nip portion SN via the first conveyance path 18*a* in the single-sided printing mode.

Further, since the pressure roller 22 of the fixing unit 20 includes the elastic layer 22*b* formed of foamed silicone rubber, the heat capacity is low. Therefore, the surface temperature difference between the fixing film 21*c* and the pressure roller 22 easily occurs, and the thick paper SG (sheet) passing through the fixing unit 20 is easily curled along the outer peripheral surface of the heating unit 21. As the thick paper SG is curled in this manner, the thick paper SG can be conveyed in a state of being close to the intermediate transfer belt 8, and image defects caused by the discharge in the gap 6*b* (see FIG. 4B) can be more effectively suppressed.

In the present embodiment, the thick paper SG can be positioned close to the intermediate transfer belt 8 with a simple configuration and at low cost, so that image defects can be suppressed.

Second Embodiment

Next, a second embodiment of the present invention will be described. The second embodiment has a configuration in which the first temperature of the first embodiment is changed to a second temperature in a discharge suppression printing mode. Therefore, a configuration similar to that of the first embodiment will be described in a manner of omitting illustration or attaching the same reference numerals in the drawings.

Figure 11:
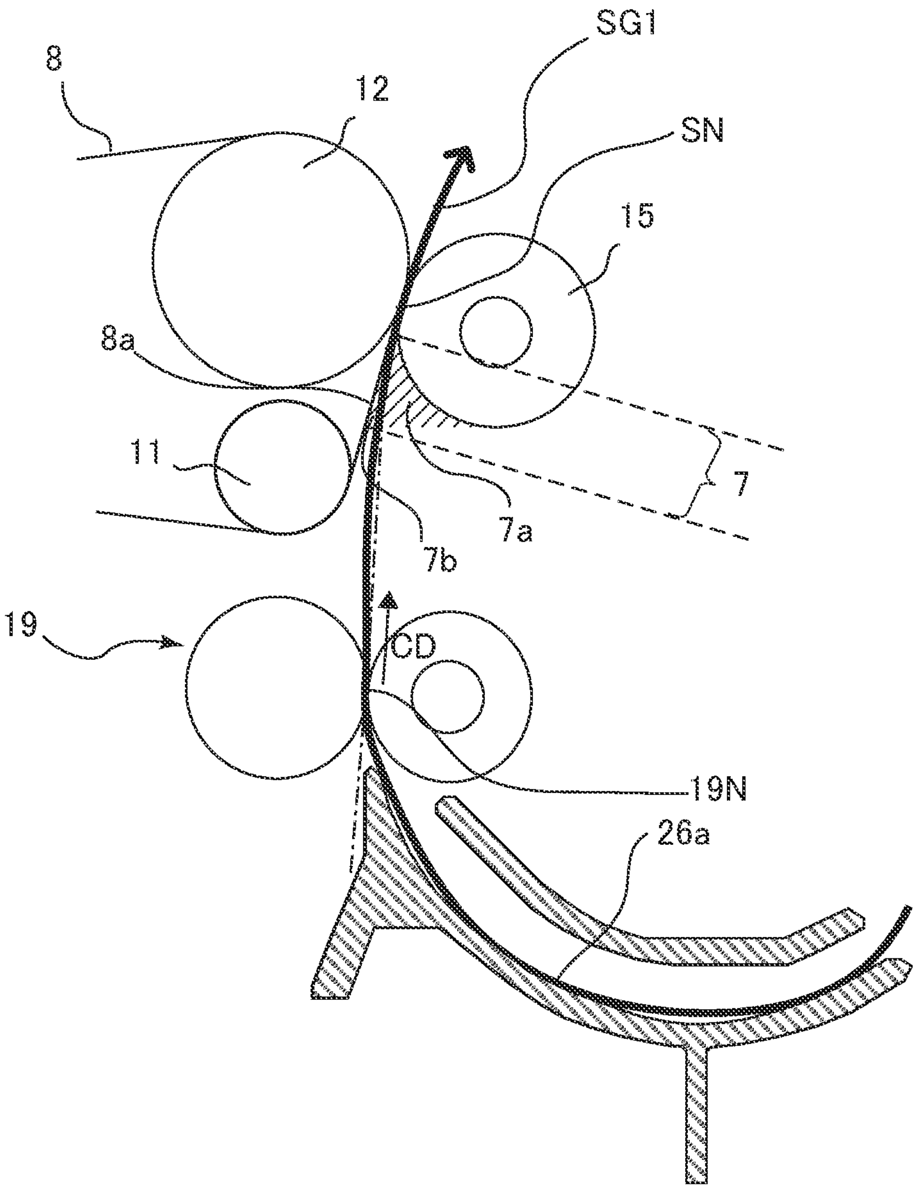
FIG. 11 is a cross-sectional view illustrating a discharge region in the vicinity of a transfer nip portion in a low humidity environment.

By the way, when a printer or sheet is left for a long period of time in a low humidity environment, a resistance of each member or sheet of the printer increases, and a discharge region formed in the vicinity of a transfer nip portion SN may become wide. FIG. 11 is a cross-sectional view illustrating a discharge region 7 in the vicinity of the transfer nip portion SN in such a low humidity environment. The discharge region 7 is wider in a sheet conveyance direction CD than the discharge region 6 described with reference to FIGS. 4A and 4B. Further, an arrow (SG1) in FIG. 11 indicates a movement trajectory of thick paper SG1 on which the discharge suppression printing mode according to the first embodiment is executed in a low humidity environment.

A gap 7*a* is formed between the thick paper SG1 and a secondary transfer roller 15 upstream of the transfer nip portion SN in the sheet conveyance direction CD. Discharge in the gap 7*a* contributes to transfer of a toner image from a belt tension portion 8*a* to a sheet S.

Meanwhile, a gap 7*b* is formed upstream of the transfer nip portion SN in the sheet conveyance direction CD and between the thick paper SG1 and the belt tension portion 8*a*. Discharge in the gap 7*b* may cause poor toner image transfer, which may result in a so-called blank area and occurrence of image defects.

As described above, even in a case where the discharge suppression printing mode according to the first embodiment is performed on the thick paper SG1, the discharge region (7) becomes wide in a low humidity environment, and thus an image defect may occur.

Figure 12:
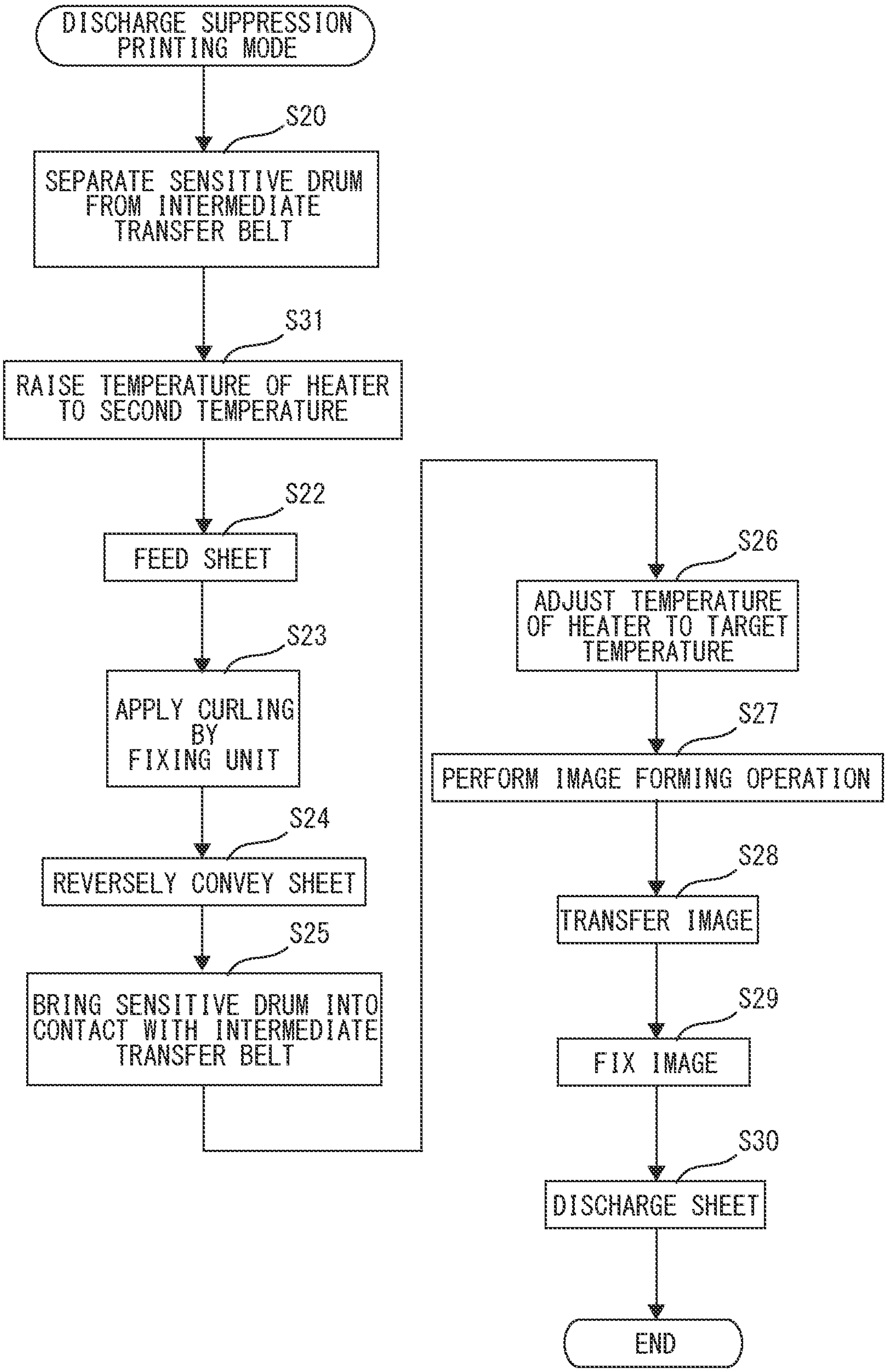
FIG. 12 is a flowchart illustrating a discharge suppression printing mode according to a second embodiment.

Therefore, a control unit 90 (see FIG. 7) of the present embodiment can execute the discharge suppression printing mode illustrated in FIG. 12. The discharge suppression printing mode according to the present embodiment illustrated in FIG. 12 is different from the discharge suppression printing mode according to the first embodiment illustrated in FIG. 10 only in step S31.

In step S31, the control unit 90 raises a temperature of a heater 21*a* until the temperature reaches the second temperature. The temperature of the heater 21*a* is adjusted to the second temperature by a thermistor 21*d*. In the present embodiment, the second temperature which is an adjusted temperature of the heater 21*a* in step S31 is set to 210° C. higher than an adjusted temperature (for example, 190° C.) for fixing the toner image.

A surface temperature difference between a heating unit 21 and a pressure roller 22 is preferably about 40° C. to 50° C. In the present embodiment, as described above, the temperature of the heater 21*a* is adjusted to the second temperature of, for example, 210° C. At this time, a surface temperature of a fixing film 21*c* is 190° C., and a surface temperature of the pressure roller 22 is about 140° C. Conditions such as a temperature setting of the heater 21*a* and the surface temperature difference between the heating unit 21 and the pressure roller 22 may be appropriately changed depending on the type of the sheet and environmental conditions.

As described above, by setting the adjusted temperature of the heater 21*a* to the second temperature higher than the target temperature for fixing the toner image, stronger curling can be applied to the sheet in step S23. Step S31 may be performed before step S20, or may be performed simultaneously with step S20.

Similarly to the first embodiment, the discharge suppression printing mode according to the present embodiment includes first conveyance processing, second conveyance processing, and third conveyance processing described below. The first conveyance processing includes steps S31, S22, and S23, and is processing of conveying the sheet toward a reverse conveyance unit 70 via a first conveyance path 18*a*, the transfer nip portion SN, and a fixing nip portion N without transferring the toner image to the sheet at the transfer nip portion SN. The second conveyance processing includes step S24, and is processing of conveying the sheet toward the second conveyance path 26*a* by the reverse conveyance unit 70 after the first conveyance processing. The third conveyance processing includes steps S26, S27, S28, and S29, and is processing of transferring the toner image to the sheet at the transfer nip portion SN after the second conveyance processing.

In the discharge suppression printing mode, the control unit 90 controls the heater 21*a* such that a temperature of the heater 21*a* in the first conveyance processing is different from a temperature of the heater 21*a* in the third conveyance processing. More specifically, the control unit 90 controls the heater 21*a* such that the temperature of the heater 21*a* in the third conveyance processing, that is, the target temperature in step S31, is lower than the temperature of the heater 21*a* in the first conveyance processing, that is, the first temperature in step S26.

Figure 13:
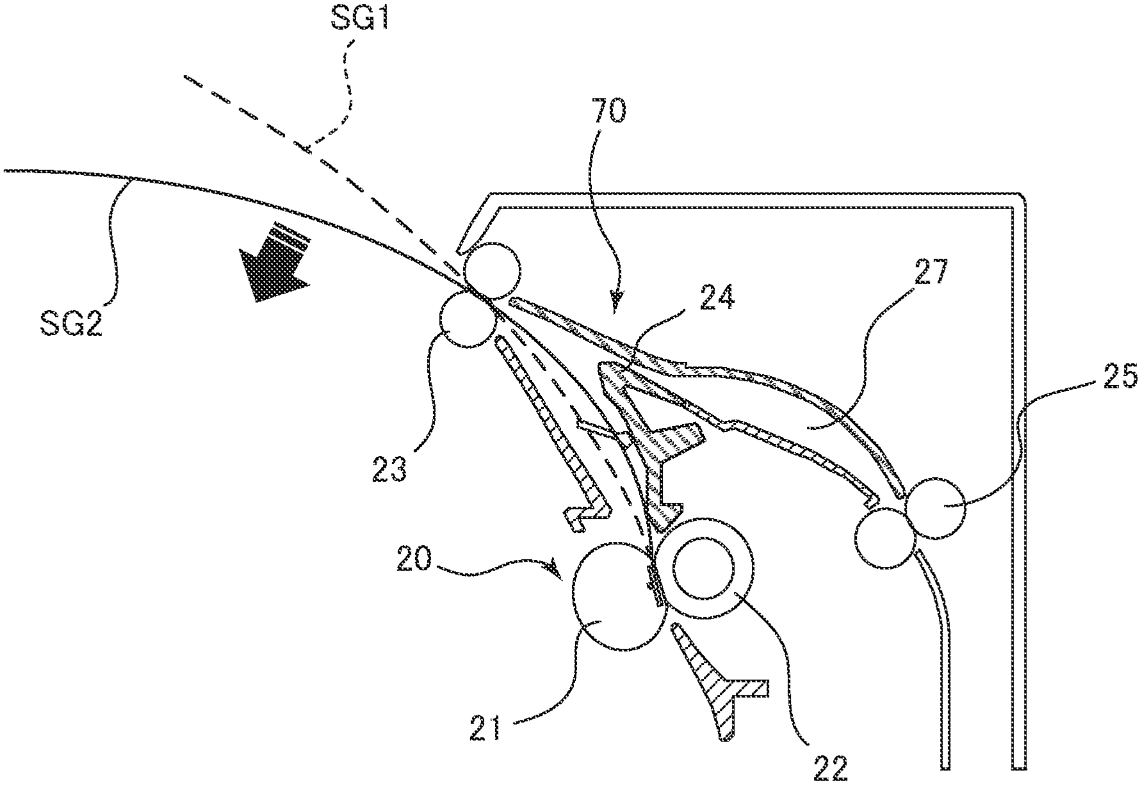
FIG. 13 is a cross-sectional view illustrating a reverse conveyance unit.

FIG. 13 is a cross-sectional view illustrating the reverse conveyance unit 70. A broken line (SG1) in FIG. 13 indicates a curled state of the thick paper SG1 during the reverse conveyance in step S24 in the discharge suppression printing mode according to the first embodiment. A solid line (SG2) indicates a curled state of thick paper SG2 during the reverse conveyance in step S24 (see FIG. 12) in the discharge suppression printing mode according to the second embodiment. The sheets of thick paper SG1 and SG2 are of the same type as the thick paper SG of the first embodiment.

By setting the adjusted temperature of the heater 21*a* of the fixing unit 20 to the second temperature (for example, 210° C.) higher than the first temperature (for example, 120° C.), the curling applied to the thick paper SG2 becomes stronger. The curling is made along the curved shape of the second conveyance path 26*a* as the front and back sides of the thick paper SG2 are reversed in the reverse conveyance unit 70.

Figure 14:
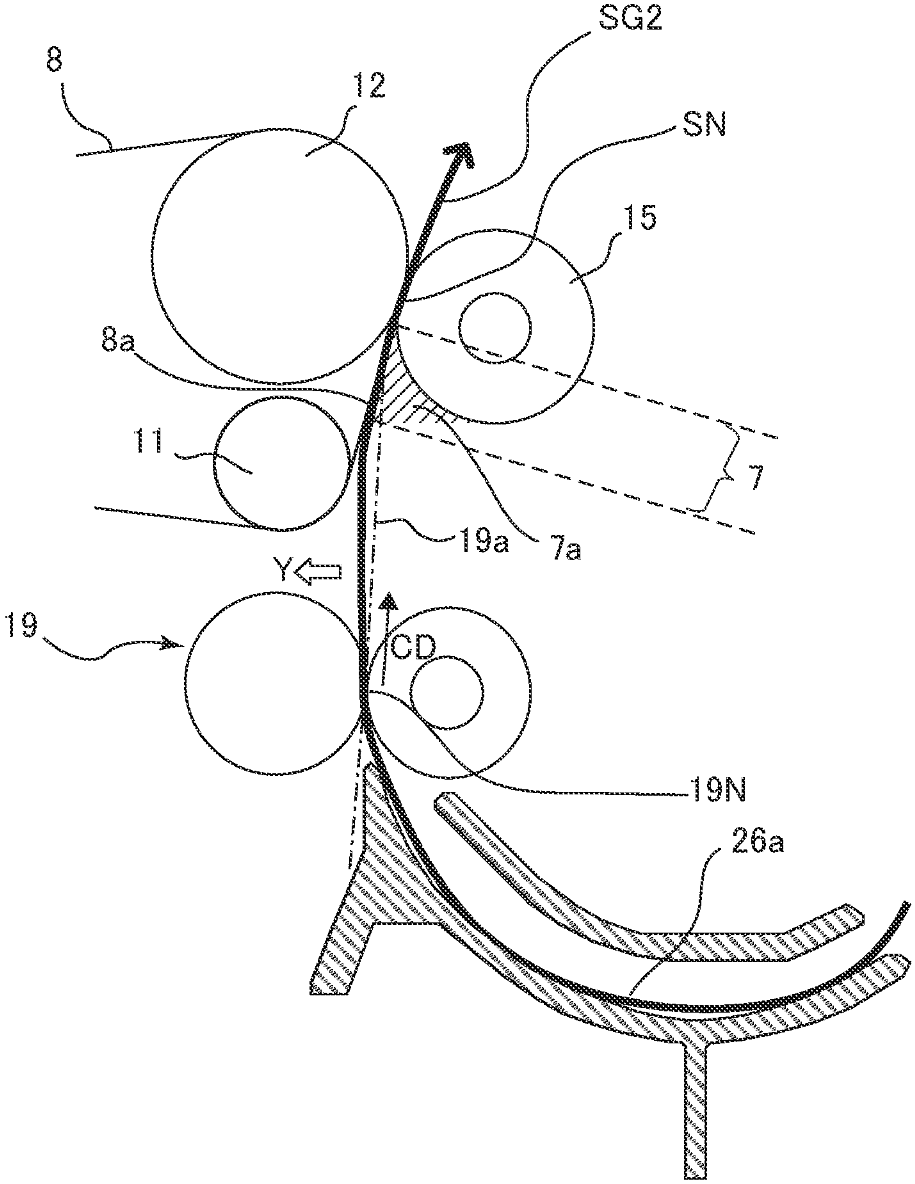
FIG. 14 is a cross-sectional view illustrating a discharge region in the vicinity of a transfer nip portion in a low humidity environment.

FIG. 14 is a cross-sectional view illustrating the discharge region 7 in the vicinity of the transfer nip portion SN in a low humidity environment. An arrow (SG2) in FIG. 14 indicates a movement trajectory of the thick paper SG2 on which the discharge suppression printing mode (see FIG. 12) according to the second embodiment is executed in a low humidity environment.

As illustrated in FIG. 14, the thick paper SG2 conveyed by a registration roller pair 19 is conveyed while further deviating from a nip line 19*a* in an arrow Y direction as compared with the first embodiment. Therefore, the thick paper SG2 reliably comes into contact with the belt tension portion 8*a* at a position upstream of the transfer nip portion SN in the sheet conveyance direction CD. Since the thick paper SG2 enters the transfer nip portion SN while being in contact with the belt tension portion 8*a*, there is no gap 7*b* illustrated in FIG. 11 between the thick paper SG2 and the belt tension portion 8*a*. Therefore, even with the thick paper SG2 having a high stiffness in a low humidity environment, it is possible to suppress image defects and to transfer the toner image satisfactorily.

The thick paper SG2 strongly curled in step S23 of FIG. 12 is curled in a direction opposite to the curling applied in step S23, in step S29. Therefore, the thick paper SG2 is discharged to the outside of the apparatus in a state in which the curl is reduced.

Confirmation of Effect

In order to confirm the effect of the discharge suppression printing mode according to the present embodiment, printing was performed under an environment of a room temperature of 15° C. and a humidity of 10%, and the presence or absence of occurrence of an image defect caused by the discharge in the gap 7*b* (see FIG. 11) was confirmed.

A sheet used is thick paper with a basis weight of 200 $g/m^2$, and a size of the sheet is A4 size. The thick paper was exposed to the above environment for 48 hours. Printing was performed on the thick paper in a single-sided printing mode, the discharge suppression printing mode according to the first embodiment (hereinafter, referred to as a first discharge suppression printing mode), and the discharge suppression printing mode according to the second embodiment (hereinafter, referred to as a second discharge suppression printing mode). In addition, the occurrence of an image defect was visually evaluated. The experimental results are shown in Table 2 below.

TABLE 2

| | Thick paper (200 g/m$^2$) |
|---|---|
| Single-sided printing mode | Image defect occurred |
| First discharge suppression printing mode | Slight image defect occurred |
| Second discharge suppression printing mode | No image defect |

As shown in Table 2 above, in a case of the thick paper left at a room temperature of 15° C. and a humidity of 10% for a long period of time, an image defect caused by the discharge in the gap 7*b* (see FIG. 11) occurred in the single-sided printing mode and the first discharge suppression printing mode. On the other hand, in the second discharge suppression printing mode, an image defect caused by the discharge in the gap 7*b* (see FIG. 11) did not occur even with the thick paper left at a room temperature of 15° C. and a humidity of 10% for a long period of time, and good transferability could be provided.

As described above, in the discharge suppression printing mode according to the present embodiment, the temperature of the heater 21*a* is adjusted to the second temperature higher than the target temperature for fixing the toner image in step S31. Then, in this state, the thick paper SG2 passes through the fixing nip portion N in step S23, whereby stronger curling can be applied to the thick paper SG2. As a result, even when the discharge region (7) becomes wide in a low humidity environment, an image defect caused by the discharge in the gap 7*b* (see FIG. 11) can be suppressed.

In the present embodiment, the thick paper SG can be positioned close to the intermediate transfer belt 8 with a simple configuration and at low cost, so that image defects can be suppressed.

Other Embodiments

The heater 21*a* of the fixing unit 20 is in direct contact with the fixing film 21*c* in any of the embodiments described above, but the present technology is not limited thereto. For example, the heater 21*a* may be configured to be in contact with the fixing film 21*c* via a sheet material having a high thermal conductivity such as an iron alloy or aluminum.

In any of the embodiments described above, curling is applied to the thick paper SG by the fixing unit 20, but the present technology is not limited thereto. For example, a curling applying mechanism for applying curling may be provided separately from the fixing unit 20. For example, the curling applying mechanism includes a rubber roller and a sponge roller.

In any of the embodiments described above, the pressure roller 22 includes the elastic layer 22*b* formed of foamed silicone rubber, but the present technology is not limited thereto. For example, the elastic layer 22*b* may be formed of foamed rubber containing chloroprene rubber or ethylene propylene rubber as a main component.

In any of the embodiments described above, the discharge suppression printing mode has been described as a mode in which printing is performed only on one side of the sheet, but the present technology is not limited thereto. For example, after printing is performed on one side of the sheet, printing may be performed on both sides of the sheet by performing steps S17 to S19 and S16 in FIG. 9.

The discharge suppression printing mode according to the first embodiment and the discharge suppression printing mode according to the second embodiment may be selectable. That is, the control unit 90 may be configured to be able to execute both the discharge suppression printing mode according to the first embodiment and the discharge suppression printing mode according to the second embodiment. The control unit 90 may automatically select either the discharge suppression printing mode according to the first embodiment or the discharge suppression printing mode according to the second embodiment based on the detection result of the environment sensor 31. In any of the embodiments described above, the discharge suppression printing mode is executed for thick paper, but the present technology is not limited thereto. For example, the discharge suppression printing mode may be executed for coated paper or plain paper.

In any of the embodiments described above, the sheet is reversed by the sheet discharge roller pair 23, but the present technology is not limited thereto. For example, the reversing of the sheet may be performed by a roller group including three rollers, or may be performed by a roller pair that performs only the reversing.

The image forming apparatus includes a printer, a copier, a facsimile, and a multifunction peripheral, and refers to an apparatus that forms an image on a sheet used as a recording medium based on image information input from an external PC or image information read from a document. In addition to a main body having an image forming function, the image forming apparatus may be connected to accessory equipment such as an option feeder, an image reading device, or a sheet processing device, and the entire system to which such accessory equipment is connected is also a type of the image forming apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-064365, filed Apr. 11, 2023, which is hereby incorporated by reference herein in its entirety.

What is claimed is:

1. An image forming apparatus comprising:

an image forming unit including:

an image bearing member configured to bear a toner image;

an intermediate transfer member to which the toner image on the image bearing member is primarily transferred; and a transfer roller configured to form a transfer nip portion together with the intermediate transfer member and to secondarily transfer the toner image on the intermediate transfer member to a sheet at the transfer nip portion;

a conveyance rotary member pair configured to convey the sheet in a sheet conveyance direction toward the transfer nip portion;

a fixing unit disposed downstream of the transfer nip portion in the sheet conveyance direction, the fixing unit including:

a heating unit; and a pressure roller including an elastic layer including a foam and configured to form a fixing nip portion together with the heating unit;

a first conveyance path disposed upstream of the conveyance rotary member pair in the sheet conveyance direction and configured to guide the sheet to the conveyance rotary member pair from a side opposite to a rotation shaft of the transfer roller with respect to a nip line of the conveyance rotary member pair, a second conveyance path disposed upstream of the conveyance rotary member pair in the sheet conveyance direction and configured to guide the sheet to the conveyance rotary member pair from a same side as the rotation shaft with respect to the nip line;

a reverse conveyance unit configured to convey the sheet having passed through the first conveyance path, the conveyance rotary member pair, the transfer nip portion, and the fixing nip portion to the second conveyance path; and a control unit configured to control the image forming unit, the conveyance rotary member pair, and the reverse conveyance unit, wherein the control unit is configured to perform a conveyance operation of conveying the sheet, the conveyance operation including:

(i) a first conveyance processing of conveying the sheet toward the reverse conveyance unit via the first conveyance path, the transfer nip portion, and the fixing nip portion without transferring the toner image to the sheet at the transfer nip portion;

(ii) a second conveyance processing of conveying the sheet toward the second conveyance path by the reverse conveyance unit after the first conveyance processing; and (iii) a third conveyance processing of transferring the toner image to the sheet at the transfer nip portion after the second conveyance processing, a surface, of the sheet, that faces the pressure roller in the first conveyance processing being configured to face the intermediate transfer member in the third conveyance processing.

2. The image forming apparatus according to claim 1, wherein the second conveyance path and the intermediate transfer member are disposed such that, in a case where the sheet is guided by the second conveyance path and curved along the second conveyance path, a leading edge of the sheet abuts on the intermediate transfer member.

3. The image forming apparatus according to claim 1, wherein the conveyance rotary member pair forms a conveyance nip portion that nips and conveys the sheet, and a second distance between the conveyance nip portion and the second conveyance path is shorter than a first distance between the conveyance nip portion of the conveyance rotary member pair and the transfer nip portion.

4. The image forming apparatus according to claim 3, wherein in a case where a sheet having a smallest size among the sheets allowed to be conveyed to the second conveyance path by the control unit is set as a minimum sheet, the first distance is shorter than a length obtained by subtracting the first distance from a length of the minimum sheet in the sheet conveyance direction.

5. The image forming apparatus according to claim 1, wherein the nip line of the conveyance rotary member pair intersects the intermediate transfer member at a position positioned upstream of the transfer nip portion in the sheet conveyance direction.

6. The image forming apparatus according to claim 1, further comprising:

a first roller configured to sandwich the intermediate transfer member together with the transfer roller, and a second roller, wherein the intermediate transfer member is disposed so as to surround the first roller and the second roller, and an angle formed by the nip line and a portion of the intermediate transfer member is 30 degrees or less, the portion being positioned upstream of the first roller and downstream of the second roller in a rotation direction of the intermediate transfer member.

7. The image forming apparatus according to claim 1, wherein the foam is foamed rubber.

8. The image forming apparatus according to claim 1, wherein the fixing unit includes a heater, and the control unit is configured to control, in the conveyance operation, the heater such that a temperature of the heater in the first conveyance processing is different from a temperature of the heater in the third conveyance processing.

9. The image forming apparatus according to claim 8, wherein the control unit is configured to control, in the conveyance operation, the heater such that the temperature of the heater in the third conveyance processing is higher than the temperature of the heater in the first conveyance processing.

10. The image forming apparatus according to claim 8, wherein the control unit is configured to control, in the conveyance operation, the heater such that the temperature of the heater in the third conveyance processing is lower than the temperature of the heater in the first conveyance processing.

11. The image forming apparatus according to claim 1, further comprising:

a sheet accommodation unit configured to accommodate the sheet; and a feeding unit configured to feed the sheet accommodated in the sheet accommodation unit, wherein the control unit is configured to control, in the conveyance operation, the feeding unit to feed the sheet before controlling the image forming unit to form the toner image on the image bearing member.

* * * * *